DIGITAL CONVERTER

Filed Nov. 3, 1958 5 Sheets-Sheet 1

INVENTORS:
Bevitt J. Norris
Basil B. Nichols
Roswell W. Gilbert
Bernard Cohen

By Smyth & Roston
Attorneys

DIGITAL CONVERTER

Filed Nov. 3, 1958

5 Sheets-Sheet 2

INVENTORS:
Bevitt J. Norris
Basil B. Nichols
Roswell W. Gilbert
Bernard Cohen

By Smyth & Roston

Attorneys.

April 23, 1963 B. J. NORRIS ET AL 3,087,147

DIGITAL CONVERTER

Filed Nov. 3, 1958 5 Sheets-Sheet 3

INVENTORS:
Bevitt J. Norris
Basil B. Nichols
Roswell W. Gilbert
Bernard Cohen

By Smyth & Roston
Attorneys

April 23, 1963 B. J. NORRIS ET AL 3,087,147

DIGITAL CONVERTER

Filed Nov. 3, 1958 5 Sheets-Sheet 4

INVENTORS:
Bevitt J. Norris
Basil B. Nichols
Roswell W. Gilbert
Bernard Cohen

By Smyth & Roston
Attorneys

INVENTORS.
Bevill J. Norris
Basil B. Nichols
Roswell W. Gilbert
Bernard Cohen
By Smyth & Roston
Attorneys United States Patent Office 3,087,147

Patented Apr. 23, 1963

3,087,147
DIGITAL CONVERTER

Bevitt J. Norris and Basil B. Nichols, San Diego, Calif., Roswell W. Gilbert, Montclair, N.J., and Bernard Cohen, La Jolla, Calif., assignors, by mesne assignments, to Daystrom, Incorporated, Murray Hill, N.J., a corporation of Texas Filed Nov. 3, 1958, Ser. No. 771,350
19 Claims. (Cl. 340—347)

This invention relates to analog-to-digital converters and more particularly to apparatus for converting an input potential into a plurality of signals providing a digital indication as to the amplitude of the input potential.

In recent years, digital computers have been developed to perform mathematical computations with accuracies previously considered unattainable. These computers receive pluralities of signals in which successive signals in the plurality represent successive digits of a number. The computer combines these signals to produce pluralities of output signals in which each plurality of signals represents the results of the combination of the input quantities. In this manner, various operations such as addition, subtraction, multiplication and division can be performed to solve complex mathematical relationships.

Digital computers have been used to perform more than mathematical operations. For example, the computers are used to process data and to control certain operations in accordance with the processed data. By way of illustration, various parameters such as distances and angles may be combined in particular mathematical relationships to control the movement of an object such as an airplane. Measurements of distance and angles ordinarily occur on an analog basis in which the values of these parameters are indicated by a single value such as the amplitude of an electrical potential. In order to be processed by the computer, these potentials have to be converted into pluralities of signals digitally representing the analog quantities. The digital signals are then processed by the computer and the resultant quantities obtained from the computer are used to control the movements of the object such as the airplane.

This invention constitutes an improvement of a system disclosed and claimed in co-pending application Serial No. 657,874, filed May 8, 1957, by Roswell W. Gilbert, now Patent No. 3,051,939. The invention relates to a system for converting input potentials representing analog quantities into pluralities of signals corresponding to the values of the analog quantities. The system provides this conversion by introducing energy to an integrator for a period of time and at a rate dependent upon the value of the input quantity. At periodic times, the energy in the integrator becomes dissipated at a substantially constant rate until the occurrence of a particular energy level in the integrator. At such a time, the energy ceases to be dissipated and a new cycle for the build up of energy in the integrator commences. By measuring the time in which the energy in the integrator is being dissipated, an indication may be obtained as to the value of the input quantity. This indication may occur in digital form by providing for the passage of periodic clock pulses during the time that the energy in the integrator is being dissipated.

The introduction of energy to the integrator is controlled by the production of a potential across an impedance member which is included in a charging circuit with the integrator. The potential across this impedance member is compared with the input potential such that any difference in these potentials is introduced to an amplifier for adjusting the rate at which energy is introduced into the integrator. This adjustment is in a direction for reducing any difference between the input potential and the potential across the impedance member.

In order to obtain a substantially constant dissipation of energy in the integrator, a substantially constant potential should be produced in the discharge circuit relative to the potential produced across the impedance member. By adjusting for the value of the voltage across the impedance member, the voltage available to provide a discharge through the capacitance remains substantially constant. As one of the features of the invention, stages are included for adjusting a regulated source of direct potential in accordance with the variations in the potential across the impedance member so as to maintain a substantially constant rate for the dissipation of energy in the integrator.

Means are also included in the integrator for providing a digital indication as to the value of input potentials having a negative polarity. In this way, analog quantities having a negative polarity can be converted into a corresponding plurality of digital signals. Such means provide for the dissipation of energy in the integrator even when negative potentials occur and at a rate dependent upon the magnitude of the negative potential.

The system constituting this invention also includes features for successfully isolating the potentials in the digital computer from the potentials in the converter. This is important since the ground potential in the digital computer may be different from the ground potential in the converter. Such isolating means include gate circuits having input and output stages which are coupled to each other so that the input stages will control the operation of the output stages but which are electrically isolated from each other. In this way, the input stage of the gate may have a ground controlled by the converter, and the output stage of the gate may have a ground controlled by the computer. Such gate means may be in the form of pulse transformers. The operation of the gate circuits is controlled in accordance with the periodic increase and decrease of energy in the integrator. During the period in which the energy level in the integrator is decreasing, the gate circuits are in condition to obtain a passage of the periodic clock pulses which provide a digital indication as to the value of the analog quantity.

Other features are included in the invention. For example, circuitry is included to provide a cyclic build-up and dissipation of energy in the integrator. This circuitry is operative to provide the passage of the clock signals only during particular cycles and to prevent the passage of the clock signals during the other cycles. By sequentially obtaining the passage of the clock signals in certain cycles and inhibiting the passage of the clock signals in other cycles, the system constituting this invention is given an opportunity to become stabilized in operation before any measurements are made. In this way, the number of pulses passing through the system in each measurement provides an accurate indication as to the value of the analog input quantity.

The apparatus constituting this invention also includes additional stages which are used when a plurality of measurements are to be converted into digital form by the converter on a sequential basis. As the voltage measurement representing each successive quantity is to be converted, continuous circuits are established so that the converter will receive the voltage representing the value of the quantity. The additional stages are included to test whether or not the converter has at any instant a continuous circuit established to a voltage representing the value of the quantity to be converted. The additional stages produce a first output signal when the converter is receiving a proper voltage, and the stages produce a second output signal upon the failure of the converter to receive a proper voltage as a result of an open circuit.

Figures 1, 2:
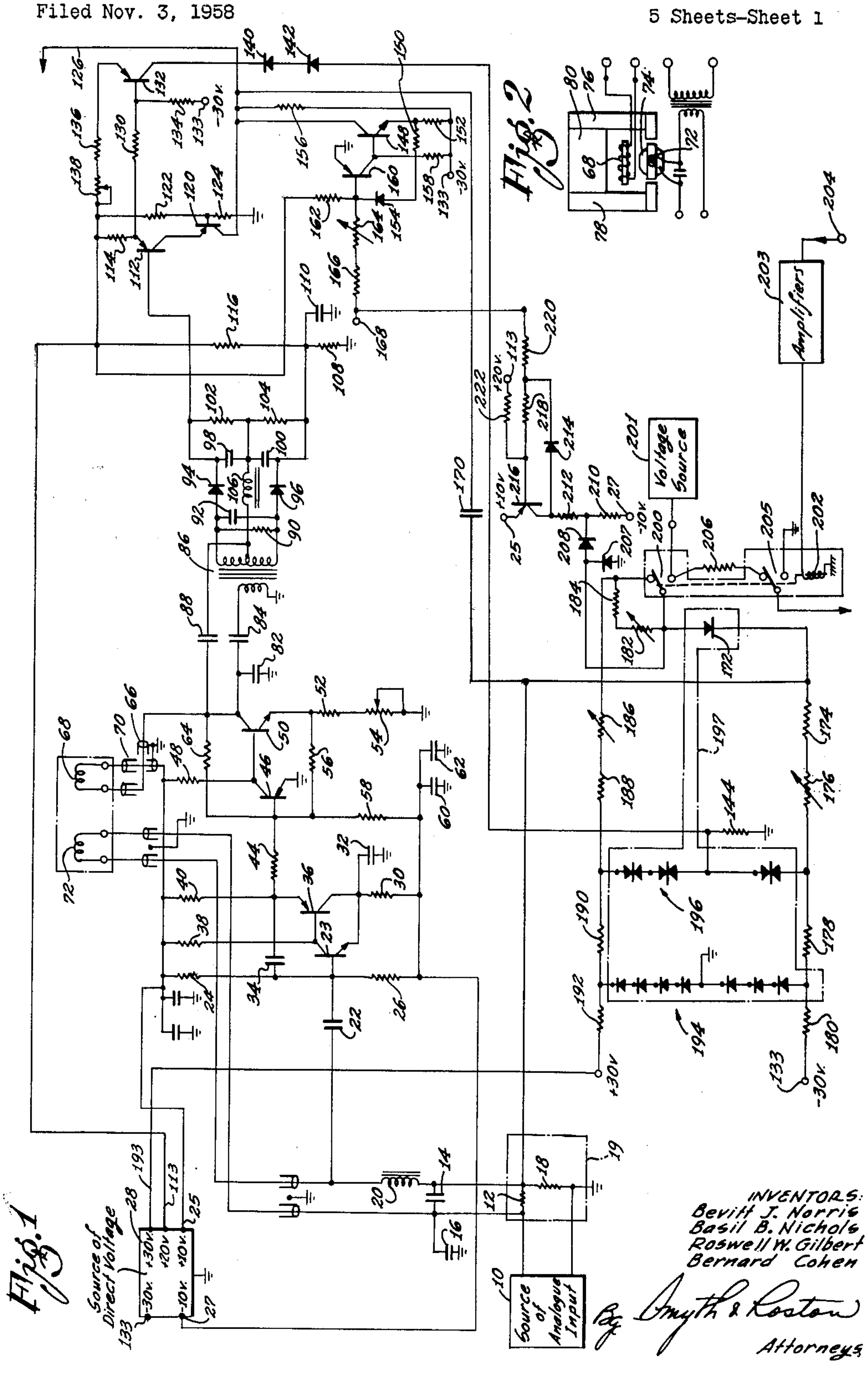
FIGURE 1 is a circuit diagram of certain electrical stages included in one embodiment of a digital converter constituting this invention.
FIGURE 2 is a view of certain windings included in FIGURE 1 and also includes a schematic showing of magnetic circuitry operatively controlled by these windings.
Figure 3:
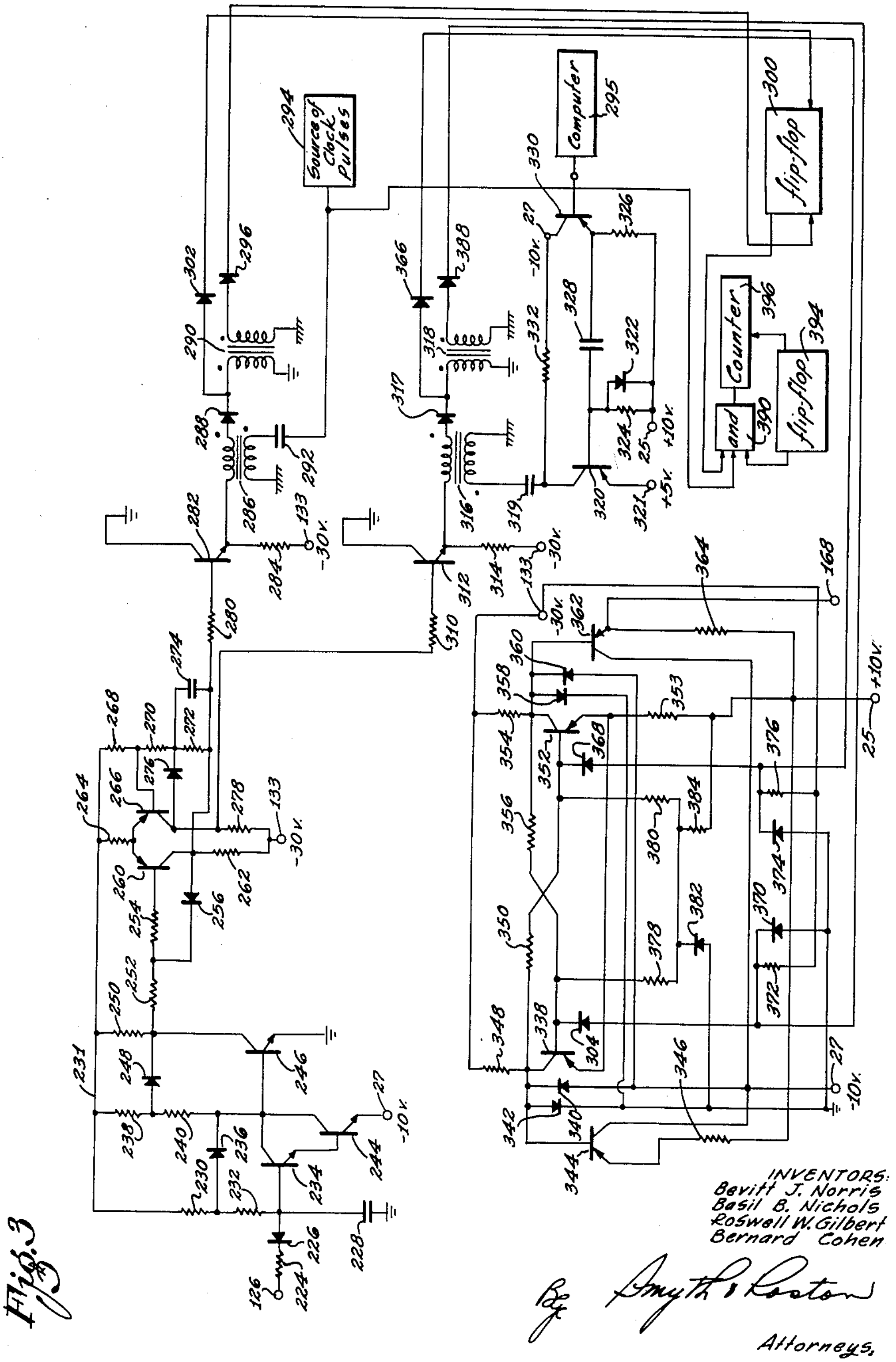
FIGURE 3 is a circuit diagram, partly in block form, of additional electrical stages included in the embodiment of the invention shown in the drawings.
Figure 4:
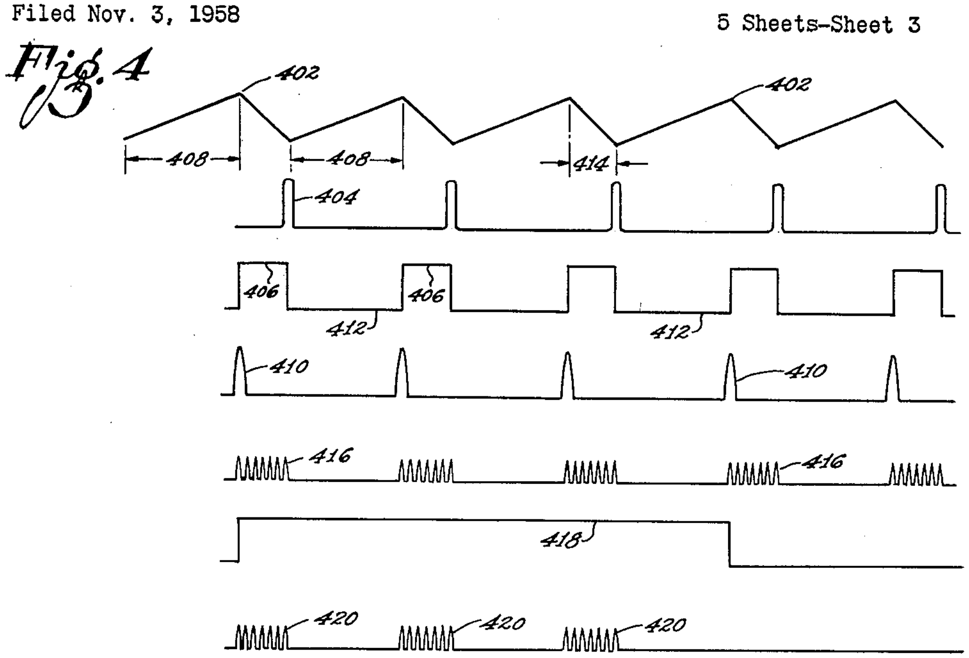
Figure 5:
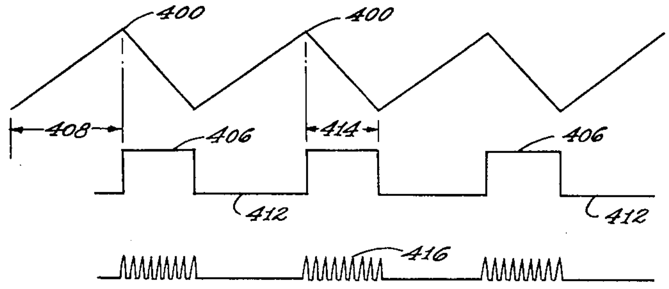
Figure 6:
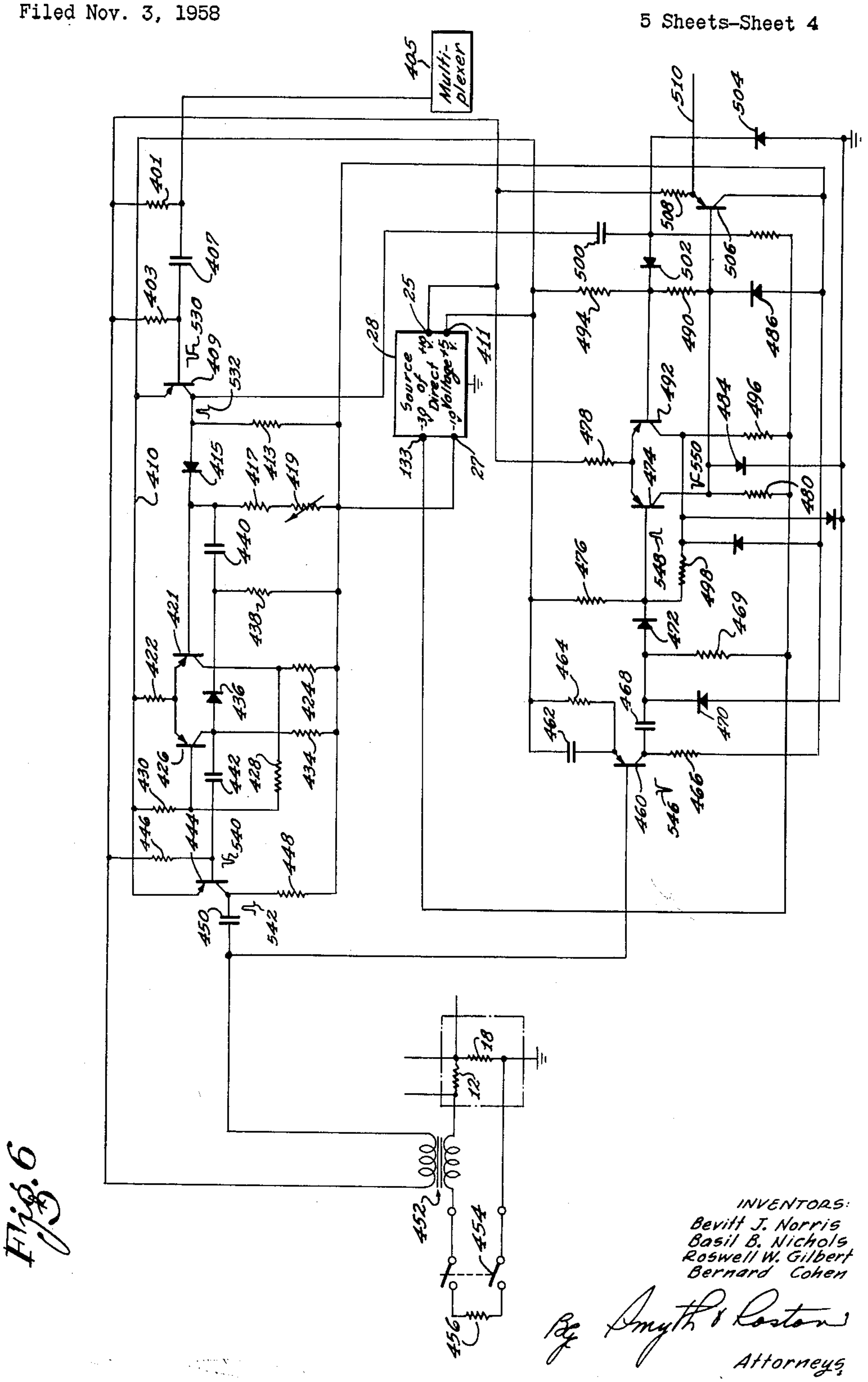
Figure 7:
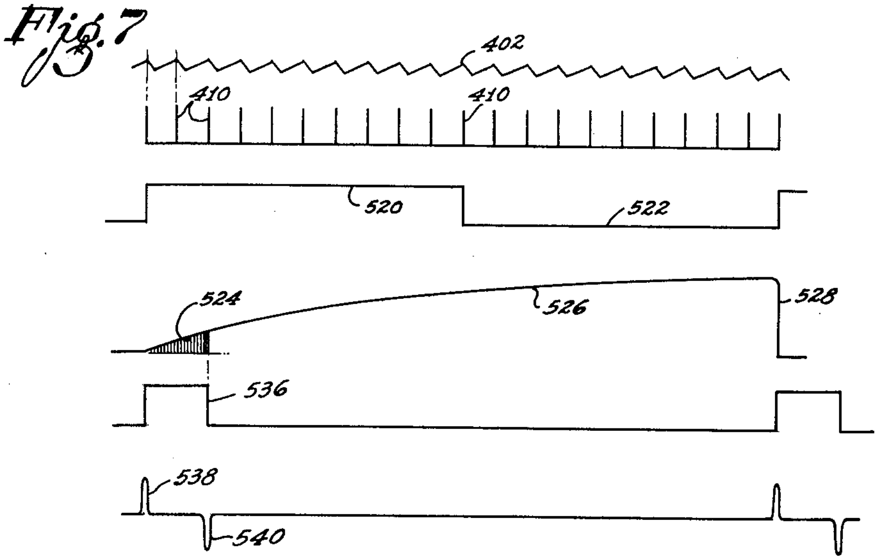
Figure 8:
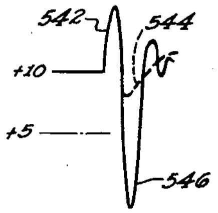

FIGURE 4 illustrates curves of voltage wave forms at strategic terminals in the electrical circuitry shown in FIGURES 1 and 3 when the analog input quantity to the digital converter has a first particular value; and FIGURE 5 illustrates curves of voltage wave forms at strategic terminals in the electrical circuitry shown in FIGURES 1 and 3 when the analog input quantity to the digital converter has a second particular value;

FIGURE 6 is a circuit diagram, partly in block form, of testing apparatus which may be included in the converter to insure that proper analog measurements are being made when a plurality of different quantities are being measured and converted into digital form on a sequential basis;

FIGURE 7 illustrates voltage wave forms at strategic terminals in the circuitry shown in FIGURE 6; and FIGURE 8 illustrates a first voltage wave form produced by the circuit shown in FIGURE 6 upon the occurrence of a proper analog measurement and further illustrates a second voltage wave form produced by the circuit shown in FIGURE 6 upon a lack of occurrence of a proper analog measurement.

In the embodiment of the invention shown in the drawings, a source 10 (FIGURE 1) is adapted to provide a direct voltage which is variable in accordance with the variations in an analog input quantity. One terminal of the source 10 may be grounded and the other terminal is connected to a first terminal in a resistance 12, which may be provided with a value of approximately 220 ohms. A capacitance 14 having a value of approximately 0.05 microfarad is in parallel with the resistance 12 and a capacitance 16 having a value of approximately 0.47 microfarad is connected between the first terminal of the resistance 12 and ground. A precision resistance 18 having a suitable value such as 50 ohms extends electrically between the second terminal of the resistance 12 and ground. The resistances 12 and 18 may be disposed within a container such as an oven indicated schematically at 19 for maintaining the temperature of the resistances within precise and narrow elements.

An inductance 20 and a capacitance 22 are in series between the base of an NPN transistor such as a Type GT167 and the terminal common to the resistances 12 and 18. The inductance 20 may be provided with a value of approximately 50 millihenries and the capacitance 22 may be provided with a value of approximately 1500 microfarads. Resistances 24 and 26 are disposed electrically between positive and negative terminals of a source of direct voltage 28 such that the resistance 24 receives a positive potential of approximately +10 volts from a terminal 25 in the source and the resistance 26 receives a negative potential of approximately −10 volts from a terminal 27 in the source. Each of the resistances 24 and 26 is provided with a value of approximately 47,000 ohms. A resistance 30 having a suitable value such as approximately 10 kilo-ohms is connected between the emitter of the transistor 23 and the terminal 27 in the voltage source 28. A capacitance 32 having a value of approximately 0.1 microfarad has one terminal connected to the emitter of the transistor 23 and the other terminal grounded.

A capacitance 34 having a value of approximately 1500 microfarads is disposed electrically between the base of the transistor 23 and the emitter of a PNP transistor 36, which may be a Type GT123. The base of the transistor 36 has a common connection with the collector of the transistor 23 and with one terminal of a resistance 38 having a value of approximately 39 kilo-ohms. The other terminal of the resistance 38 is adapted to receive the positive potential of +10 volts from the terminal 25 in the voltage source 28. One terminal of a resistance 40 having a value of approximately 5.6 kilo-ohms is adapted to receive the positive potential of +10 volts from the terminal 25 in the source 28 and the other terminal of the resistance 40 is connected to the emitter of the transistor 36. The emitter of the transistor 23 and the collector of the transistor 36 have common connections.

Connections are made from the emitter of the transistor 36 to one terminal of a resistance 44 and from the other terminal of the resistance to the base of a transistor 46, which may be an NPN transistor such as a Type GT167. The emitter of the transistor 46 is grounded and the collector is adapted to receive a positive potential through a resistance 48 from the terminal 25 in the voltage source 28. The resistances 44 and 48 may be respectively provided with values of approximately 3.3 and 22 kilo-ohms.

The potential on the collector of the transistor 46 is applied directly to the base of an NPN transistor 50, which may be a Type GT 167. A resistance 52 and a rheostat 54 are in series between the emitter of the transistor 50 and the converter ground. The resistance 52 and the rheostat 54 are respectively provided with values of approximately 22 ohms and 20 ohms. A resistance 56, a resistance 58 and a pair of parallel capacitances 60 and 62 are in series between the emitter of the transistor 50 and the converter ground. The resistances 56 and 58 may be respectively provided with values of approximately 1 kilo-ohm and 10 kilo-ohms, and the capacitances 60 and 62 may be respectively provided with values of approximately 0.2 microfarad and 100 microfarads. A resistance 64 having a suitable value such as approximately 82 kilo-ohms is in series with the resistance 58 and the capacitances 60 and 62 between the collector of the transistor 50 and ground. The common terminal between the resistances 56, 58 and 64 is connected to the base of the transistor 46.

The collector of the transistor 50 receives the signals passing from one terminal of a coil 68 through the internal conductor in a cable 66. The other terminal of the coil 68 is connected to the internal conductor in a cable 70, which extends electrically to the terminal 25 in the voltage source 28. The outer terminals of the cables 66 and 70 are grounded. The coil 68 is included in an assembly with a coil 72 (FIGURES 1 and 2) which is electrically coupled through suitable cables to the resistance 12 and the inductance 20. The coil 72 is pivotably mounted for rotation on a core 74 (FIGURE 2) made from soft iron. The core 74 is included in a magnetic loop with a pair of soft-iron pole pieces 76 and 78 and with a permanent magnet 80 disposed between the pole pieces 76 and 78. The windings 68 and 72 and the magnetic circuit may be constructed in a manner similar to that disclosed in Patent 2,744,168 issued to Roswell W. Gilbert.

A capacitance 82 (FIGURE 1) having a suitable value such as approximately 820 microfarads is connected between the collector of the transistor 50 and ground. A capacitance 84 and the primary winding of a transformer 86 are in series across the capacitance 82. The secondary winding of the transformer 86 is center-tapped and a capacitance 88 is connected between the collector of the transistor 50 and this center tap. The capacitances 84 and 88 may be respectively provided with values of approximately 100 micro-microfarads and 0.03 microfarad. A resistance 90 and a capacitance 92 are in parallel across the end terminals of the secondary winding in the transformer 86. The resistance 90 and the capacitance 92 may be respectively provided with values of approximately 47 kilo-ohms and 2,000 micro-microfarads.

The plates of diodes 94 and 96 are respectively connected to the end terminals of the secondary winding of the transformer 86. A pair of capacitances 98 and 100 are in series between the cathodes of the diodes 94 and 96 and may be provided with values of approximately 0.01 microfarad. A pair of resistances 102 and 104 are respectively in parallel with the capacitances 98 and 100 and may be provided with values of approximately 47 kilo-ohms. An inductance 106 having a value of approximately 50 millihenries is connected at one end to the center tap in the secondary winding of the transformer 86 and at the opposite end to the capacitances 98 and 100 to the resistances 102 and 104.

Connections are made from the cathode of the diode 96 to first terminals of a resistance 108 and a capacitance 110, the second terminals of which are grounded. The resistance 108 and the capacitance 110 may be respectively provided with values of approximately 20 kilo-ohms and 0.01 microfarad. The cathode of the diode 94 is connected to the base of a PNP transistor 112, which may be a Type 2N217. The emitter of the transistor 112 is connected to receive a positive potential from a terminal 113 of the source 28 through a resistance 114 having a value of approximately 470 ohms. The terminal 113 in the source 28 is adapted to provide a potential of approximately +20 volts from the source 28. One terminal of a resistance 116 is also connected to receive this positive potential from the source 28 and the other terminal of the resistance 116 is connected to the cathode of the diode 96. The resistance 116 may be provided with a value of approximately 680 ohms.

The collector of the transistor 112 and the emitter of a PNP transistor 120 have common connections. The PNP transistor 120 may be a Type 2N398. A pair of resistances 122 and 124 are connected to the base of the transistor 120 and may be respectively provided with values of approximately 5.1 kilo-ohms and 15 kilo-ohms. The resistances 122 and 124 extend electrically to ground from the terminal 113 in the source 28. The collector of the transistor 120 is connected to an output line 126 (FIGURES 1 and 3).

A resistance 130 having a suitable value such as approximately 1 kilo-ohm is connected between the emitter of the transistor 112 and the base of a PNP transistor 132, which may be a Type 2N43. The base of the transistor 132 is biased through a resistance 134 from a terminal 133 of the voltage source 28 adapted to provide a negative potential of approximately −30 volts. The resistance 134 may be provided with a value of approximately 240 kilo-ohms. A resistance 136 and a rheostat 138 are in series between the emitter of the transistor 132 and the terminal 113 in the voltage source 28. Connections are made from the collector of the transistor 132 to the cathode of a diode 140 and from the plate of the diode 140 to the cathode of a diode 142. The plate of the diode 142 has a common connection with one terminal of a resistance 144 having its other terminal grounded. The diodes 140 and 142 may be respectively Types 651C7 and 653C9 and the resistance 144 may have a value of approximately 10 ohms.

The line 126 is also connected to the collector of an NPN transistor 148, which may be a Type 953 manufactured by Texas Instruments. The emitter of the transistor 148 has a common connection with first terminals of resistances 150 and 152. The second terminal of the resistance 152 is connected to receive −30 volts from the terminal 133 in the source 28, and the second terminal of the resistance 150 is connected to the plate of a diode 154, which may be a Type 653C9. A resistance 156 is connected at one end to the line 126 and at the other end is connected to receive −30 volts from the terminal 133 in the source 28. The resistances 150, 152 and 156 may be respectively provided with values of approximately 12 kilo-ohms, 1 kilo-ohm and 100 kilo-ohms.

A resistance 158 having a value of approximately 15 kilo-ohms is connected at one end to the base of the transistor 148 and is connected at the other end to receive a negative potential of −30 volts from the terminal 133 in the voltage source 28. The base of the transistor 148 also has a common connection with the collector of a PNP transistor 160, which may be a Type 2N43. The emitter of the transistor 160 is connected to the converter ground and the base of the transistor 160 is provided with common connections to the cathode of the diode 154 and to a first terminal of a resistance 162. The second terminal of the resistance 162 is connected to the terminal 113 in the voltage source 28 to receive a positive potential of approximately +20 volts. A rheostat 164 and a resistance 166 are in series between the base of the transistor 160 and a control terminal 168 (FIGURES 1 and 3). The resistance 162, the rheostat 164 and the resistance 166 may be respectively provided with values of approximately 8.2 kilo-ohms, 5 kilo-ohms and 5.1 kilo-ohms.

The line 126 is also connected to one terminal of an integrator such as a capacitor 170 having its second terminal connected to the common terminal between the resistance 12 and 18. The capacitance 170 may have a suitable value dependent upon the number of output digital numbers desired to be produced per second. For example, the capacitor 170 may have a value of 2.5 microfarads when an output digital number rate of 1 per second is desired to be produced. Similarly, the capacitor 170 may have a value of approximately 1.0 microfarad when a digital number rate of 5 per second is desired to be produced.

The second terminal of the capacitor 170 is also connected to the cathode of a diode 172 and to a resistance 174. The diode 172 may be a Type 1N137A and the resistance 174 may have a value of approximately 35 kilo-ohms. A rheostat 176, a resistance 178 and a resistance 180 are in series between the resistance 174 and the terminal 133 in the source 28. The rheostat 176, the resistance 178 and the resistance 180 may respectively have values of approximately 10 kilo-ohms, 1 kilo-ohm and 650 ohms.

A rheostat 182, a resistance 184, a rheostat 186 and resistances 188, 190 and 192 are in series between the plate of the diode 172 and a terminal 193 in the voltage source 28. The rheostats 182 and 186 may respectively have values of approximately 10 kilo-ohms and 200 ohms, and the resistances 184, 188, 190 and 192 may respectively have values of approximately 30 kilo-ohms, 3.1 kilo-ohms, 500 ohms and 270 ohms. The terminal 193 in the voltage source 28 is adapted to provide a suitable positive potential of approximately +30 volts.

A plurality of Zener diodes generally indicated at 194 are in series between the terminal common to the resistance 190 and 192 and the terminal common to the resistance 178 and 180. Similarly, a plurality of Zener diodes generally indicated at 196 are in series between the terminal common to the resistances 188 and 190 and the terminal common to the rheostat 176 and the resistance 178. Certain of the Zener diodes 196 also have a common connection to the plate of the diode 142. The Zener diodes 194 and 196 and the diode 172 are disposed in an oven indicated schematically at 197 to regulate the temperature of the diodes within precise and narrow limits.

The movably contact of a single-pole, double-throw switch 200 is connected to the plate of the diode 172. The upper stationary contact of the switch 200 in FIGURE 1 is connected to the terminal common to the resistance 184 and the rheostat 186. The lower stationary contact of the switch 200 receives the output from a voltage source indicated in block form at 201. The voltage source 201 is used when the source 10 constitutes a converter for changing an alternating voltage into a direct voltage having an amplitude proportionate to the mean value of the alternating voltage. The operation of the switch 200 is controlled by a relay 202 having one terminal connected to the ground provided by a computer and having its other terminal connected to a plurality of amplifier stages 203. The operation of the amplifiers 203 is controlled by input signals introduced to the amplifiers through a line 204 to obtain a digital conversion of a direct voltage obtained from an alternating voltage.

The relay 202 also controls the operation of a single-pole, double-throw relay 205. The movable contact of the relay 205 is connected to the ground for the source 10 when the source 10 operates to convert an alternating voltage into a proportionate direct voltage. The lower stationary contact of the switch 205 in FIGURE 2 is connected to the ground of the digital converter constituting this invention. A resistance 206 having a value of approximately 120 ohms is connected between the upper stationary contact of the switch 205 and the lower stationary contact of the switch 200 in FIGURE 1.

The plate of the diode 172 is connected to the cathode of a diode 207 and to the plate of a diode 208 both of which may be Type 1N137A. The plate of the diode 207 is connected to the converter ground, and the cathode of the diode 208 is connected to the common terminal between a pair of resistances 210 and 212. The resistance 210 is connected to the terminal 27 in the source 28 to receive a negative potential of approximately −10 volts. The resistances 210 and 212 may be respectively provided with values of approximately 1500 ohms and 470 ohms. The second terminal of the resistance 212 has common connection with the plate of a diode 214 and with the collector of a transistor 216. The diode 214 may be a Type 1N67A and the transistor may be a Type 2N123.

A resistance 218 having a suitable value such as approximately 330 ohms extends electrically between the base of the transistor 216 and the cathode of the diode 214. A resistance 220 having a suitable value such as 5.6 kilo-ohms is disposed electrically between the cathode of the diode 214 and the terminal 168. The emitter of the transistor 216 is connected to receive a positive potential of +10 volts from the terminal 25 in the source 28. A resistance 222 having a suitable value such as 4.7 kilo-ohms is connected between the base of the transistor 216 and the terminal 113 in the source 28.

In addition to the connections previously described, the line 126 in FIGURES 1 and 3 is connected to one terminal of a resistance 224 (FIGURE 3) having its other terminal connected to the cathode of a diode 226. A capacitance 228 extends electrically between the plate of the diode 226 and the converter ground. The resistance 224 and the capacitance 228 may be respectively provided with values of approximately 1 kilo-ohm and 0.01 microfarad and the diode 226 may be a Type 1N67A. A pair of resistances 230 and 232 are in series between the line 231 and the capacitance 228. The resistances 230 and 232 may respectively have values of approximately 2.2 megohms and 120 kilo-ohms.

The signal on the plate of the diode 226 is introduced to the base of an NPN transistor 234, which may be a Type 2N35. The collector of the transistor 234 has a common connection with the cathode of a diode 236, the plate of which is connected to the terminal common to the resistances 230 and 232. The diode 236 may be a Type 1N67A. A pair of resistances 238 and 240 are in series between the line 231 and the collector of the transistor 234 and may respectively have values of approximately 20 kilo-ohms and 1 kilo-ohm.

The emitter of the transistor 234 has a common connection with the base of an NPN transistor 244, which may be a Type 2N35. The emitter of the transistor 244 is connected to receive a negative potential of approximately −10 volts from the terminal 27 in the source 28. The collector of the transistor 244 is connected to the collector of the transistor 234 and to the base of an NPN transistor 246, which may also be a Type 2N35. The emitter of the transistor 246 is connected to the converter ground.

Connections are made from the collector of the transistor 246 to the cathode of a diode 248 and from the plate of the diode to the terminal common to the resistances 238 and 240. The collector of the transistor 246 also has a common connection with first terminals of resistances 250 and 252, which may be respectively provided with values of approximately 39 kilo-ohms and 4.7 kilo-ohms. The second terminal of the resistance 250 is connected to the line 231, and the second terminal of the resistance 252 is connected to a resistance 254 and to the cathode of a diode 256. The resistance 254 may have a value of approximately 2.2 kilo-ohms and the diodes 248 and 256 may both be Types 1N67A.

The second terminal of the resistance 254 has a common connection with the base of a PNP transistor 260, which may be a Type 2N123. The collector of the transistor 260 is connected to the plate of the diode 256 and to one terminal of a resistance 262, which may have a value of approximately 10 kilo-ohms. The resistance 262 is connected to the terminal 133 in the voltage source 28 to receive a potential of −30 volts. The emitter of the transistor 260 is connected to one terminal of a resistance 264 having its other terminal connected to the line 231. The resistance 264 may be provided with a value of approximately 1.5 kilo-ohms.

The emitter of the transistor 260 is connected to the emitter of a transistor 266, which may also be a Type 2N123. The base of the transistor 266 is connected to the terminal common to a pair of resistances 268 and 270 which are in series with a resistance 272 between the line 231 and the plate of the diode 256. The resistances 268, 270 and 272 may respectively have values of approximately 12 kilo-ohms, 1 kilo-ohm and 10 kilo-ohms. A capacitance 274 having a value of approximately 300 micromicrofarads is in parallel with the resistance 272. The cathode of a diode 276 is connected to the terminal common to the resistances 270 and 272, and the plate of the diode is connected to the collector of the transistor 266. A resistance 278 having a value of approximately 8.2 kilo-ohms is connected at one end to the collector of the transistor 266 and is connected at the other end to the terminal 133 in the voltage source 28 to receive a potential of −30 volts.

A resistance 280 having a value of approximately 4.7 kilo-ohms extends electrically between the plate of the diode 256 and the base of an NPN transistor 282, which may be a Type GT167. The collector of the transistor 282 is connected to the converter ground, and the emitter of the transistor 282 is connected to one terminal of a resistance 284 having a value of approximately 5.6 kilo-ohms. The second terminal of the resistance 284 is connected to the terminal 133 in the voltage source 28 to receive a negative potential of −30 volts. The emitter of the transistor 282 is also connected to one terminal of the secondary winding in a pulse transformer 286, the other terminal of the secondary winding being connected to the plate of a diode 288. The primary winding of a pulse transformer 290 is disposed electrically between the cathode of the diode 288 and the converter ground.

The primary winding of the transformer 286 has one terminal connected to the computer ground and has the other terminal coupled through a capacitance 292 to a source 294 of clock pulses from computer 295. The computer 295 is not specifically shown but may be any digital computer which is now being manufactured and sold and which is well known in the art. The source 294 of clock pulses may be a blocking oscillator or may be a separate track in a magnetic drum forming a part of a digital computer.

One terminal of the secondary winding in the transformer 290 is connected to the computer ground and the other terminal is connected to the plate of a diode 296, the cathode of which is connected to a first input terminal in a flip-flop 300. The ungrounded terminal of the primary winding in the transformer 290 is also connected to the plate of a diode 302 having its cathode connected to the plate of a diode 304. The diodes 288, 296, 302 and 304 may be a Type 1N67A.

In like manner, the potential on the collector of the transistor 266 is applied to one terminal of a resistance 310 having a value of approximately 4.7 kilo-ohms. The other terminal of the resistance 310 has a common connection with the base of an NPN transistor 312, which may be a Type GT167. The collector of the transistor 312 is connected to the converter ground, and the emitter of the transistor is connected to one terminal of a resistance 314, which may be provided with a value of approximately 5.6 kilo-ohms. The second terminal of the resistance 314 is connected to receive a negative potential of approximately —30 volts from the terminal 133 in the source 28. A secondary winding of a pulse transformer 316, a diode 317 and a primary winding of a pulse transformer 318 are connected in a circuit with the emitter of the transistor 312 in a manner similar to that described above for the diode 288 and the windings of the transformers 286 and 290.

One terminal of the primary winding in the transformer 316 is connected to the computer ground, and the other terminal of the winding is coupled through a capacitance 319 to the collector of a transistor 320, which may be a Type 2N123. The emitter of the transistor 320 is connected to receive a positive potential of approximately +5 volts from a terminal 321 in the source 28. The base of the transistor 320 is connected to the plate of a diode 322 and to one terminal of a resistance 324, which may have a value of approximately 10 kilo-ohms. The cathode of the diode 322 and the second terminal of the resistance 324 are connected to receive a positive potential of +10 volts from the terminal 25 in the course 28, as is one terminal of a resistance 326.

The base of the transistor 320 is coupled through a capacitance 328 to the emitter of a PNP transistor 330, which may also be a Type 2N217. The base of the transistor 330 is connected to receive timing pulses at periodic intervals from the computer 295. The timing pulses occur at a much slower rate than the clock pulses from the source 294 for reasons which will become apparent subsequently. The collector of the transistor 330 is connected to receive a negative potential of —10 volts from the terminal 27 in the source 28 and is also connected to a resistance 332 having a value of approximately 10 kilo-ohms. The other terminal of the resistance 332 is connected to the collector of the transistor 320.

The diode 304 is included in a flip-flop with certain other components including a PNP transistor 338, which may be a Type 2N217. The base of the transistor 338 and the cathode of the diode 304 have a common connection. The collector of the transistor 338 is coupled directly to the cathode of a clamping diode 340 and to the plate of a clamping diode 342, both of which may be Type 1N67A. The cathode of the clamping diode 342 is connected to the converter ground, and the plate of the clamping diode 340 is connected to the terminal 27 in the voltage source 28 to receive a negative potential of approximately —10 volts.

A connection is also made from the collector of the transistor 338 to the base of a transistor 344, which may also be a Type 2N217. The collector of the transistor 344 is connected to the negative potential of —10 volts at the terminal 27 in the voltage source 28. The emitter of the transistor 344 has a positive potential applied to it from the terminal 25 in the voltage source 28 through a resistance 346, which may have a value of approximately 10 kilo-ohms.

In addition to the connections previously described, the collector of the transistor 338 has a common connection with one terminal of a resistance 348, the other terminal of which is connected to the terminal 133 in the voltage source 28. A resistance 350 is disposed electrically between the collector of the transistor 338 and the base of a transistor 352, which may also be a Type 2N217. The emitters of the transistors 338 and 352 are directly coupled to one another. Connections are also made from the emitters of the transistors 338 and 352 to one terminal of a resistance 353 having a value of approximately 1 kilo-ohm and from the other terminal of the resistance to the terminal 25 in the voltage source 28.

The collector of the transistor 352 is connected to one terminal of a resistance 354, the other terminal of which receives the negative potential on the terminal 133 in the voltage source 28. The resistances 348 and 354 may have values of approximately 6.8 kilo-ohms. A resistance 356 extends electrically from the collector of the transistor 352 to the base of the transistor 338. The resistance 350 and 356 may have values of approximately 15 kilo-ohms.

The collector of the transistor 352 connected in a manner similar to the collector of the transistor 338 has common connections with the plate of a diode 358 and with the cathode of a diode 360, both of which may be Type 1N67A. The plate of the diode 360 is connected to the terminal 27 in the voltage source 28 to receive a negative potential of approximately —10 volts, and the cathode of the diode 358 is connected to the converter ground. The collector of the transistor 352 is also connected to the base of a transistor 362, which may be a Type 2N217. The collector of the transistor 362 receives the negative potential on the terminal 27 of the voltage source 28. The emitter of the transistor 362 has a positive potential applied to it through a resistance 364 from the terminal 25 in the voltage source 28, the resistance 364 having a suitable value such as approximately 10 kilo-ohms. The potentials produced on the emitter of the transistor 362 are applied to the terminal 168 in FIGURES 1 and 3.

Just as signals are applied from the primary winding of the transformer 290 through the diodes 302 and 304 to the base of the transistor 338, signals are applied from the primary winding of the transformer 318 through diodes 366 and 368 to the base of the transistor 352. The diodes 366 and 368 may be Type 1N67A. The plate of the diode 304 is connected to the cathode of a diode 370 and to a first terminal of a resistance 372. The plate of the diode 370 is connected to the converter ground, and the second terminal of the resistance 372 is connected to the terminal 133 in the voltage source 28 to receive a negative potential of approximately —30 volts. A diode 374 and a resistance 376 are electrically associated with the diode 368 in a manner similar to that described above for the association between the diode 370, the resistance 372 and the diode 304. The resistances 372 and 376 may have values of approximately 51 kilo-ohms, and the diodes 370 and 374 may be Type 1N67A.

Resistances 378 and 380 are respectively connected at first terminals to the bases of the transistors 338 and 352. The resistances 378 and 380 may be provided with values of approximately 2.4 kilo-ohms. The second terminals of the resistances 378 and 380 are connected to the cathode of the diode 382 and to a first terminal of a resistance 384. The plate of the diode 382 is connected to the converter ground, and the second terminal of the resistance 384 is connected to the terminal 25 in the voltage source 28 to receive a positive potential of approximately +10 volts. The diode 382 may be a Type 651C7, and the resistance 384 may have a value of approximately 1 kilo-ohm.

The flip-flop 300 may be constructed in a manner similar to that formed in part by the transistors 338, 344, 352 and 362 and described fully above. The flip-flop 300 may be provided with two input terminals which may be designated as the left and right input terminals. The left input terminal receives the signals from the secondary winding of the pulse transformer 290 in a manner similar to that previously described. The right input terminal of the flip-flop 300 has signals applied to it through a diode 388 from the secondary winding of the pulse transformer 318.

The signals from the left output terminal of the flip-flop 300 are applied to an input terminal of an "and" network 390, which may be constructed in a manner similar to that shown in FIGURE 3 of Patent 2,723,080 or FIGURE 12 of Patent 2,609,143. Other input terminals of the "and" network 390 receive the clock signals from the source 294 and the potential on the left output terminal of a flip-flop 394. The flip-flop 394 is connected in the computer to be triggered alternately to one state of conductivity and then to the other state at a substantially constant rate. For example, the flip-flop 394 may be triggered on a cyclic basis to its opposite states of conductivity at a rate of 5 times per second. This rate is considerably less than the rate at which clock pulses are produced by the source 294, and it is also considerably less than the rate at which timing pulses are produced by the computer 295.

The signals passing through the "and" network 390 are introduced to a counter 396, which may be constructed in a conventional manner to provide a digital indication as to number of signals introduced to the counter. For example, the counter 396 may be constructed in a manner similar to that disclosed on pages 194 to 204, inclusive of "Arithmetic Operations in Digital Computers" by R. K. Richards (published by Van Nostrand). The counter 396 may be cleared after each count by a signal from the right output terminal of the flip-flop 394.

The source 10 is adapted to produce a voltage which is variable in accordance with the variations in the characteristics of a particular quantity. For example, the source 10 may be a transducer which produces a direct voltage having an amplitude variable in accordance with the variations in the measurements of ambient temperature or in the measurements of relative humidity. This variable direct voltage is introduced to the movable coil 72 (FIGURES 1 and 2) to vary the direct current flowing through the coil. This variation in current causes a deflection of the movable coil 72 to be obtained by interaction of the flux produced by this current and the flux threading the magnetic circuit formed by the permanent magnet 80, the pole pieces 76 and 78 and the core 74. This flux is combined with the flux produced in the magnetic circuit by the flow of alternating current through the field coil 68. In this way, the movable coil 72 assumes at any instant a pivotal position which is dependent upon the direction and magnitude of the direct voltage introduced to the coil from the source 10, and an alternating signal is induced in the coil depending upon its position relative to the alternating flux field.

As the coil 72 varies in pivotal position, corresponding variations are produced in the reluctance of the magnetic circuit formed by the permanent magnet 80, the pole pieces 76 and 78 and the core 74. These variations in reluctance are produced since the length of the air gap in the magnetic circuit is varied. This causes variations to be produced in the potential induced in the coil 68 such that the potential has a magnitude and phase proportional at any instant to the magnitude and direction of deflection produced in the coil 72. Since the field coil 68 is connected in a tuned circuit with the capacitor 82, the resonant frequency of this tuned circuit varies in accordance with changes in the pivotal position of the coil 72.

The variations in the frequency of the tuned circuit formed by the coil 68 and the capacitance 82 may also be seen from the following discussion. As the coil 72 pivots from a position parallel to the legs of the pole pieces 76 and 78, an alternating voltage is induced in the coil. The amplitude of this induced alternating voltage is dependent upon the amount of pivotal movement produced in the coil 72. The alternating voltage induced in the coil 72 produces a counter effect in the magnetic circuit formed by the permanent magnet 80 and the pole pieces 76 and 78, and this counter effect in turn affects the frequency response of the coil 68.

The transistors 46 and 50 are included in an oscillator which has a frequency dependent upon the resonant characteristics of the tuned circuit formed by the coil 68 and the capacitance 82. The transistors 46 and 50 form an oscillator because of the positive feedback provided through the resistance 64 from the collector of the transistor 50 to the base of the transistor 46. A negative feedback is also produced through the resistance 56 between the emitter of the transistor 50 and the base of the transistor 46. This negative feedback serves to stabilize forward gain thereby preserving wave form and frequency and raises the output impedance to yield a higher Q tuned circuit.

The signals produced by the oscillator are introduced to the primary winding of the transformer 86. The transformer 86 is loosely coupled by means of condenser 84 to the oscillator tuned circuit to produce a quadrature phase shift between the signals introduced to the primary winding and the signal introduced to the center tap of the secondary winding through the capacitor 88. The quadrature phase shift produced by the loose coupling to the transformer 86 and the resonant frequencies provided by the different combinations of resistances, inductances and capacitances are instrumental in obtaining the proper operation of the discriminator formed by the elements 84 to 104, inclusive (even numbers only), in FIGURE 1.

The discriminator is constructed in a well known manner to produce no potential difference between the cathodes of the diodes 94 and 96 when the frequency of the oscillator has a particular value. For frequencies of the oscillator on one side of this particular value, the potential on the cathode of the diode 94 is greater than the potential on the cathode of the diode 96 such that a positive voltage can be considered as being produced in the discriminator. Similarly, the discriminator receives a greater potential at the cathode of the diode 96 than at the cathode of the diode 94 when the frequency of the oscillator is on the other side of the particular value. The difference in the amplitude of the potential produced at the cathodes of the diodes 94 and 96 at any instant is substantially proportional to the variations in the frequency of the oscillator from the particular value.

The potentials produced on the cathode of the diode 94 are introduced to the base of the transistor 112 to control the flow of current through the transistor. For example, the current flowing through the transistor 112 increases when the potential at the cathode of the diode 94 decreases to indicate changes in the frequency of the signals from the oscillator to one side of the particular value. Similarly, the current flowing through the transistor 112 decreases in accordance with increases in the potential on the cathode on the diode 94, such increase in potential resulting from changes in the frequency of the signals from the oscillator to the other side of the particular value. Since the resistance 114 is connected in series with the transistor 112, the potential produced at the emitter of the transistor 112 varies in accordance with the flow of current through the transistor. By way of illustration, the potential at the emitter of the transistor 112 decreases as the flow of current through the transistor increases.

The transistor 120 is connected in a circuit with the transistor 112 to receive a flow of current dependent upon the current flowing through the transistor 112. This current also flows through a circuit including the capacitance 170 and the resistance 18 so as to charge the capacitance 170 at a rate dependent upon the amplitude of the current flow. The current also produces across the resistance 18 a potential having at any instant an amplitude dependent upon the magnitude of the current flow. Any differences between the potential produced across the resistance 18 and the potential provided by the source 10 appear across the resistance 12. Such differences in potential are introduced to the coil 72 to obtain corresponding variations in the pivotal position of the coil. These variations in the pivotal position of the coil 72 produce corresponding variations in the resonant frequency of the circuit formed by the coil 68 and the capacitance 82 so as to provide corresponding variations in the frequency of the oscillator. The variations in the frequency of oscillation are detected by the discriminator so as to produce corresponding variations in the potential introduced to the base of the transistor 112. In this way, the currents flowing through the transistors 112 and 120 become adjusted until the potential produced across the resistance 18 equals the potential provided by the source 10. Because of this closed loop operation, the currents flowing through the transistors 112 and 120 to obtain a charging of the capacitance 170 are directly proportional to the potential provided by the source 10 at any instant.

The charging of the capacitance 170 continues for a substantially constant period of time, as will become apparent from the subsequent discussion. Since the time for charging the capacitance in any cycle of operation remains substantially constant, the charge produced in the capacitance can be considered as being dependent only upon the amplitude of the charging current flowing through the capacitance. For example, the capacitance 170 becomes charged to a relatively high level 400 in FIGURE 5 when the charging current flowing through the capacitance and through the transistor 120 has a relatively large amplitude. Similarly, the capacitance 170 becomes charged to a relatively low level 402 in FIGURE 4 when the amplitude of the charging current flowing through the transistor 120 and the capacitance 170 is relatively low.

During the time that the capacitance 170 is being charged, a relatively high voltage is introduced from the terminal 168 to the base of the transistor 160. This relatively high voltage prevents the transistor 160 from becoming conductive. Since the transistor 160 is not conductive, a negative potential approaching −30 volts is produced on the collector of the transistor 160 and is introduced to the base of the transistor 148. This potential prevents the transistor 148 from being conductive so that the capacitance 170 cannot discharge through the transistor.

At the end of the period for charging the capacitance 170, a relatively low potential is introduced to the terminal 168 as will be described in detail subsequently. This potential causes the transistor 160 to become conductive so that a flow of current occurs through the voltage source 28, the resistance 158 and the transistor. The flow of current through the transistor 160 causes a potential approaching the converter ground to be produced on the collector of the transistor 160 for introduction to the base of the transistor 148. Upon the introduction of a potential approaching ground to the base of the transistor 148, the transistor becomes conductive and provides a path for the discharge of the capacitance 170. At such a time, the capacitance 170 discharges through a circuit including the voltage source 28, the resistances 192, 190 and 188, the rheostat 186, the resistance 184, the rheostat 182, the diode 172, the capacitance 170, the transistor 148 and the resistance 152.

The discharge current flowing through the capacitance 170 has an amplitude considerably greater than the maximum amplitude of the charging current flowing through the capacitance. For example, the range of the charging current flowing through the transistor 120 and the capacitance 170 is between 0 and 1 milliamperes whereas the discharge current flowing through the capacitance has a substantially constant value of 5 milliamperes. Since the discharge current is substantially greater than the charging current, the transistor 148 is included to provide a discharge path so that the discharge current will not have to flow through the transistor 120. Otherwise, the transistor 120 would have to absorb the difference between the maximum current of 1 milliampere normally supplied by it during the charging portion of each measuring cycle and the value of 5 milliamperes during the discharge portion of each measuring cycle. The transistor 120 is also included as a buffer stage to control impedances so that a constant impedance is presented to the capacitance 170 in the charging and discharging portions of each measuring cycle.

As previously described, the potential on the emitter of the transistor 112 is dependent upon the flow of current through the transistor and therefore upon the potential produced across the resistance 18. This potential is introduced to the base of the transistor 132 to produce corresponding variations in the flow of current through the transistor. For example, the potential introduced to the base of the transistor 132 decreases in accordance with the increase in the flow of current through the transistor 112. This decrease in the potential introduced to the base of the transistor 132 produces an increase in the flow of current through the transistor. In this way, the amplitude of the current flowing through the transistor 132 at any instant tends to follow the amplitude of the current flowing through the transistor 112 at that instant. The current flowing through the transistor 132 also flows through the diodes 140 and 142 which provide a breakdown so as to bring the potential across the resistance 144 at any instant to a relatively low value approximating the potential produced across the resistance 18 at that instant.

As previously described, a potential of approximately 60 volts is applied by the voltage source 28 between the resistances 180 and 192. This potential difference is applied to the Zener diodes 194 which operate to regulate the voltage so that the voltage has variations of only 0.1% from the desired value. The voltage produced across the Zener diodes 194 are applied through the resistances 178 and 190 to the Zener diodes 196, which provide a further regulation in the potential. It should be appreciated that other arrangements than the Zener diodes 194 and 196 can be used to provide a regulation in the operating potential.

Because of the further regulation provided by the Zener diodes 196, the potential difference produced between the terminal common to the resistances 188 and 190 and the terminal common to the resistance 178 and the rheostat 176 has a maximum variation of 0.01%. This potential difference is applied at particular times to the capacitance 170 to produce a discharge of the capacitance at a substantially constant rate in a manner previously described. The potential applied to the capacitance 170 to produce a discharge of the capacitance has a value of substantially 17.5 volts between the converter ground and the terminal common to the resistances 188 and 190.

In order to produce a discharge of the capacitance 170 at a substantially constant rate, the potential applied to the capacitance should remain constant within precise limits. However, as will be seen, the potential across the resistance 18 tends to cause the potential at one terminal of the capacitance to vary in accordance with variations in the potential produced across the resistance. Because of this, the variations in the potential produced across the resistance 18 may produce corresponding variations in the potential effective to obtain a discharge of the capacitance 170. The potential produced across the resistance 18 has a typical range between 0 and 50 millivolts and the potential at the terminal common to the resistances 188 and 190 has a value of 17.5 volts. Because of this, the potential produced across the resistance 18 may produce a typical variation of (0.050/17.5) (100)=0.3% variation in the effective potential for providing a discharge of the capacitance 170. This variation of 0.3% is considerably greater than the maximum variation of 0.01% produced by the Zener diodes 194 and 196 in regulating the potential from the source 28. This may cause the precise regulation in potential provided by the Zener diodes to be considerably nullified.

The resistance 144 and other elements are included to insure that the discharge potential applied to the capacitance 170 remains substantially constant even with variations in the potential produced across the resistance 18. This results from the fact that the current flowing through the transistor 132, the diodes 140 and 142 and the resistance 144 has at any instant an amplitude which is proportional to the amplitude of the charging current flowing through the transistor 120, the capacitance 170 and the resistance 18. The resultant voltage produced across the resistance 144 tends to follow the voltage produced across the resistance 18.

In this way, the resistance 144 operates to produce a variation in the potential at the terminal common to the resistances 188 and 190 such that this variation corresponds to the potential produced across the resistance 18. By providing the potential at the terminal common to the resistances 188 and 190 with floating characteristics, the difference in potential produced between this terminal and the ungrounded terminal of the resistance 18 remains substantially constant so that the capaciance 170 will be discharged at a substantially constant rate.

The discharge of the capacitance 170 can occur only when a negative potential is applied to the terminal 168 as previously described. This results in part because of the action of the stages including the transistors 160 and 148 in making the transistor 148 conductive only when the terminal 168 receives a negative signal. This has been described in detail previously. It also results in part because of the bias applied to the plate of the diode 172 to control the flow of discharge current through the diode and through the capacitance 170.

The potential applied to the plate of the diode 172 is determined by the conductivity of the transistor 216. Normally, the transistor 216 is cut off since a positive potential is applied to the base of the transistor through the resistance 222. Since current cannot flow through a circuit including the transistor 216 and the resistances 212 and 210, a negative potential of approximately −10 volts is produced at the terminal common to the resistances 210 and 212. This negative potential is applied to the plate of the diode 172 to bias the diodes against the flow of current. This prevents a discharge current from flowing through the diode 172 and the capacitance 170.

Upon the introduction of a negative signal to the terminal 168, this signal passes through the resistances 220 and 218 to the base of the transistor 216 to make the transistor conductive. This causes current to flow through the circuit including the transistor 216 and the resistances 212 and 210. Because of this flow of current, the potential at the terminal common to the resistances 210 and 212 rises above ground. This rise in potential cuts off the diodes 207 and 208 and prevents the diodes from providing a by-pass for the flow of current through a circuit including the resistance 184, the potentiometer 182, the diode 172 and the integrating capacitor 170.

When the diodes 207 and 208 become cut off, the potential applied to the plate of the diode 172 is sufficiently positive to allow current to flow through the diode. This current flows through a circuit including the voltage source 28, the resistances 192, 190 and 188, the rheostat 186, the resistance 184, the rheostat 182, the diode 172, the capacitance 170, the transistor 148 and the resistance 152 in a manner similar to that previously described. This current is effective in producing a discharge of the capacitance 170.

As the capacitance 170 becomes charged and discharged, the potential on the line 126 in FIGURES 1 and 3 varies accordingly. This potential is introduced to the base of the transistor 234 in FIGURE 3 to control the flow of current through the transistor. The transistor 234 is included with the transistor 244 in a circuit for providing a multiplying action on the signals introduced to the base of the transistor 234. This multiplying action is represented by current gains in the transistors and is dependent upon the potential introduced to the base of the transistor 234.

For example, when the potential introduced to the base of the transistor 234 has a potential value which is more positive than the potential of −10 volts applied to the emitter of the transistor 244, the current flowing through the transistors 234 and 244 becomes relatively high because of the gain provided by the intercoupling between the transistors. The large flow of current through the transistor 244 causes the potential on the collector of the transistor to approach the potential of −10 volts on the emitter.

The negative potential of −10 volts on the collector of the transistor 244 is introduced to the base of the transistor 246 to cut off any flow of current through the transistor. This interruption in the flow of current through the transistor 246 causes the potential on the collector of the transistor to become isolated from ground so as to rise to a potential approaching that on the terminal common to the resistances 238 and 240. This rise in potential is introduced to the base of the transistor 260 to cut off any flow of current through the transistor. The transistor 260 is included with the transistor 266 in a Schmidt triggering circuit such that the circuit operates as a flip-flop.

When the transistor 260 becomes cut off, current cannot flow through the circuit including the resistances 264, the transistor and the resistance 262. This causes the potential on the collector of the transistor 260 to approach the negative potential of −30 volts on the terminal 133 in the voltage source 28. This potential is introduced through the resistances 272 and 270 to the base of the transistor 266 to make the transistor conductive.

Upon the occurrence of a state of conductivity in the transistor 266, current flows through a circuit including the resistance 264, the transistor, the resistance 278 and the voltage source 28. The resultant voltage produced across the resistance 264 causes the potential on the emitter of the transistor 260 to decrease so as to further cut off any flow of current through the transistor 260. In this way, a regenerative feedback is provided between the transistors 260 and 266 to insure that only one of the transistors will be conductive at any one time and that the other transistor will be cut off at that time.

As the capacitance 170 discharges, the potential on the line 126 decreases. When the potential decreases to a value of substantially −10 volts, the transistors 234 and 244 become cut off because of the bias of −10 volts applied to the emitter of the transistor 244. Since current cannot flow through a circuit including the resistances 238 and 240 and the transistor 244, the potential on the collector of the transistor rises in a positive direction from a value of approximately −10 volts. This positive signal is applied to the base of the transistor 246 to produce a flow of current through the transistor. This flow of current clamps the transistor 246 to ground so as to produce a negative signal at the collector of the transistor.

The negative signal produced at the collector of the transistor 246 is applied to the base of the transistor 260 to make the transistor 260 conductive. This causes current to flow through a circuit including the resistance 264, the transistor 260 and the resistance 262. The resulting potential produced across the resistance 262 causes a positive signal to be produced on the collector of the transistor 260 for introduction to the base of the transistor 266. This positive signal cuts off the transistor 266 so that current cannot flow through a circuit including the resistance 264, the transistor and the resistance 278. The interruption in the flow of current through the circuit including the transistor 266 causes the potential on the emitter of the transistor 260 to rise so as to increase the flow of current through the transistor 260.

It will be seen from the previous discussion that a potential approaching —30 volts is produced on the collector of the transistor 260 when the potential on the line 126 is more positive than —10 volts. At the same time, a potential more positive than —30 volts is produced on the collector of the transistor 266. When the capacitance 170 becomes discharged to a value of substantially —10 volts, the flip-flop formed by the transistors 260 and 266 becomes triggered to its opposite pattern of operation. In this opposite pattern of operation, a potential more positive than —30 volts is produced on the collector of the transistor 260 at the same time that a potential of —30 volts is produced on the collector of the transistor 266.

The potential produced on the collector of the transistor 260 controls the state of conductivity of the transistor 282. For example, the transistor 282 becomes conductive when a potential more positive than —30 volts is produced on the collector of the transistor 260. This results from the fact that the emitter of the transistor 282 is biased at a potential of —30 volts. When the transistor 282 becomes conductive, current flows through a circuit including the transistor, the resistance 284 and the voltage source 28. This current causes the emitter of the transistor 282 to become clamped at the converter ground applied to the collector of the transistor.

The transistor 282 operates in combination with the transformer 286 and the diode 288 to provide a gating function. By way of illustration, clock pulses having a positive polarity may be introduced from the source 294 to the primary winding of the transformer 286. These pulses produce a positive voltage at the right terminal of the primary winding in the transformer 286 in FIGURE 3, as indicated by a dot at the right terminal of the winding.

Because of the resultant flow of current through the primary winding of the transformer 286 and because of the polarities of the primary and secondary windings in the transformer, a positive voltage is induced in the secondary winding at the right terminal of the winding in FIGURE 3. This tends to produce a flow of current through a circuit including the secondary winding of the transformer 286, the diode 288, the primary winding of the transformer 290 and the transistor 282. However, current can flow through the transistor 282 only during the time that a potential more positive than —30 volts is introduced to the base of the transistor to make the transistor conductive.

Because of the negative bias provided on the emitter of the transistor 282, the transistor becomes cut off when a potential approximating —30 volts is introduced to the base of the transistor. This causes a potential of —30 volts to be produced at the emitter of the transistor 282 and to be introduced to the plate of the diode 288. Such a negative bias on the plate of the diode 288 prevents current from flowing through the diode even when clock pulses having a positive polarity are introduced to the primary winding of the transformer 286 and are induced in the secondary winding of the transformer. In this way, pulses are able to pass only at particular times through the gating circuit formed in part by the transistor 282, the tranformer 286 and the diode 288.

The transistor 312, the transformer 316 and the diode 317 provide a gating circuit in a manner similar to that described above for the transistor 282, the transformer 286 and the diode 288. In this way, pulses are able to pass through the gating circuit only when the transistor 312 has become conductive as a result of the introduction of a potential more positive than —30 volts to the base of the transistor. At such times, a timing signal To having a positive amplitude may be introduced to the base of the transistor 330. This pulse cuts off the transistor 330 so that a positive potential approaching that on the terminal 25 of the voltage source 28 is produced on the emitter of the transistor.

The positive-going portion of the pulse produced on the emitter of the transistor 330 is absorbed by the diode 322. However, the negative-going portion at the trailing end of the pulse is introduced to the base of the transistor 320 to make the transistor conductive. The resultant flow of current through the transistor 320 causes the potential on the collector of the transistor to rise from a negative potential approximating —10 volts to a positive potential approaching +5 volts. This causes a positive pulse to be produced at the left terminal of the primary winding of the transformer 316 in FIGURE 3 as indicated by the dot in that figure. A positive pulse is then induced at the right terminal of the secondary winding of the transformer 316 in FIGURE 3 as indicated by the dot in that figure. At such times, current flows through a circuit including the secondary winding of the transformer 316, the diode 317, the primary winding of the transformer 318 and the transistor 312.

When a positive pulse is produced at the ungrounded terminal of the primary winding in the transformer 290, it passes through the diodes 302 and 304 to the base of the transistor 338 and causes the transistor to become cut off. The resultant interruption in the flow of current through the transistor 338 causes the potential on its collector to drop to the —30 volt potential of terminal 133 for introduction to the base of the transistor 352. This potential causes the transistor 352 to become conductive so as to produce a flow of current through a circuit including the voltage source 28, the resistance 353, the transistor and the resistance 354. This flow of current produces a rise in potential on the collector of the transistor 352.

The increase in potential on the collector of the transistor 352 is introduced through the resistance 356 to the base of the transistor 338 to maintain the transistor 338 non-conductive. In this way, a regenerative action is provided to insure that the transistor 338 will remain non-conductive and that the transistor 352 will remain conductive. The increase in the potential on the collector of the transistor 352 is also introduced to the base of the transistor 362 to cut off the flow of current through the transistor 362. This causes the potential at the emitter of the transistor 362 to approach the potential of +10 volts on the terminal 25 of the voltage source 28 but it is clamped at ground. The ground potential also appears at the terminal 168 in FIGURES 1 and 3.

Upon the production of a positive pulse at the ungrounded terminal of the primary winding in the transformer 318, the transistor 352 becomes cut off. This causes a negative potential which is clamped at —10 volts due to the clamping action of diode 360 to be introduced from the collector of the transistor 352 to the base of the transistor 338 to make the transistor conductive. The negative potential of —10 volts on the collector of the transistor 352 is also introduced to the base of the transistor 362 to make the transistor conductive. When the transistor 362 becomes conductive, the potential at the emitter of the transistor approaches the negative potential of —10 volts at the collector of the transistor. This negative potential of approximately —10 volts is introduced to the terminal 168 in FIGURES 1 and 3.

The conversion of an analog quantity into a plurality of signals providing a digital representation of the quantity will now be described on a chronological basis for one measuring cycle. The measuring cycle is initiated when a potential more positive than —30 volts is introduced to the base of the transistor 282 from the collector of the transistor 260. This potential is indicated at 404 in FIGURE 4. The potential 404 causes the transistor 282 to become conductive as previously described. Upon the production of the next clock signal by the source 294, a positive pulse is produced in the primary winding of the transformer 290 and is introduced to the base of the transistor 338. This causes the transistor 338 to become cut off and the transistor 352 to become conductive so that a potential approximating ground is introduced to the terminal 168 in FIGURES 1 and 3. This potential is indicated at 406 in FIGURE 4.

The ground or slightly positive potential on the terminal 168 in FIGURE 1 prevents the transistor 148 from becoming conductive and also causes a negative potential to be introduced to the plate of the diode 172. Since this prevents a discharge current from flowing through the capacitance 170, the charging current flowing through the transistor 120 and the capacitance 170 becomes paramount. The amplitude of the charging current is dependent upon the analog potential provided by the source 10. A sensitive control over the amplitude of this charging current is provided by using the coils 68 and 72 and the magnetic circuit shown in FIGURE 2 to control the frequency of oscillations produced by the transistors 46 and 50. These variations in the frequency of oscillations are converted to corrresponding variations in the potential introduced to the base of the transistor 112 so as to control the flow of current through the transistor. A proper control over the flow of current through the transistor 112 is produced because of the feedback provided to the resistance 18. This feedback is instrumental in adjusting the positioning of the coil 72 so that the potential across the resistance 18 becomes equal to the input potential from the source 10.

The charging current flows through the capacitance 170 for a particular period of time, as indicated at 408 in FIGURES 4 and 5. Because of this, the charge produced in the capacitance 170 is dependent only upon the amplitude of the voltage introduced to the converter from the source 10. For example, the capacitance 170 becomes charged to the relatively low level 402 when the analog input potential from the source 10 is relatively low, and the capacitance 170 becomes charged to the relatively high level 400 when the analog input potential from the source 10 is relatively high. At the end of the particular period of time, the timing signal *To* indicated at 410 in FIGURE 4 is produced by the computer 295 and is introduced to the base of the transistor 330 to produce a positive pulse in the primary winding of the transformer 318 in a manner similar to that described previously. This pulse is introduced to the base of the transistor 352 to cut off the transistor 352 and make the transistor 338 conductive. When the transistor 352 becomes cut off, a negative potential of −10 volts is produced at the terminal 168 in a manner similar to that described previously. The negative potential produced at the terminal 168 is indicated at 412 in FIGURES 4 and 5.

The negative potential produced at the terminal 168 makes the transistor 148 conductive and produces a potential approaching ground on the plate of the diode 172. Since the discharge path for the capacitance 170 is now completed, the capacitance discharges at a substantially constant rate. The capacitance discharges at a substantially constant rate because of the floating potential produced at the terminal common to the resistances 188 and 190 to compensate for the variations in potential produced across the resistance 18. The discharge period of the capacitance 170 is indicated at 414 in FIGURES 4 and 5.

As previously described, the timing signal 410 triggers the flip-flop formed in part from the transistors 338, 352 and 362 so as to initiate the discharge of the capacitance 170. The timing signal 410 also triggers the flip-flop 300 to produce a relatively high voltage on the left output terminal of the flip-flop for a period corresponding to the period 414 in FIGURES 4 and 5. The clock pulses produced during the period 414 are illustrated at 416 in FIGURES 4 and 5.

The high voltage on the left output terminal of the flip-flop 300 is introduced to the "and" network 390 to prepare the "and" network for the passage of signals. When a relatively high voltage is also introduced to the "and" network 390 from the left output terminal of the flip-flop 394, the clock signals from the source 294 are able to pass through the "and" network. The clock signals passing through the "and" network 390 are illustrated at 416 in FIGURES 4 and 5. These clock signals are then introduced to the counter 396, which operates to provide an indication in digital form as to the number of signals passing through the "and" network.

As previously described, the flip-flop 394 becomes alternately triggered to its two states of conductivity upon the introduction of periodic signals from the computer 295. The periodic signals introduced to the flip-flop 394 occur at a relatively slow rate so that the flip-flop has a relatively high voltage on its left output terminal for a comparatively long period of time in each cycle of operation as illustrated at 418 in FIGURE 4. For example, the flip-flop may have a relatively high voltage on its left output terminal for one tenth of a second in each cycle when each cycle has a duration of one fifth of a second. Because of the relatively long period of time during which a high voltage is produced on the left output terminal of the flip-flop 394, the clock signals from the source 294 are able to pass through the "and" network 390 for a plurality of successive measuring cycles of the converter constituting this invention. The clock pulses passing through the "and" network 390 during one of the periods 418 are illustrated at 420 in FIGURE 4.

Since clock pulses pass through the "and" network 390 for several successive measuring cycles, this causes the indication provided by the counter 396 to represent an integral of the digital signals produced over a plurality of measuring cycles such that the counter indicates in digital form an average of the analog input quantity from the source 10 over the period of these successive cycles. Such an average may be considered as desirable since it tends to eliminate minor fluctuations in measurement. The average can also be considered as desirable because it allows the analog input quantity to settle to a stable value at the input terminal common to the source 10 and the resistance 12 when a multiplexing operation is being performed to obtain a digital conversion in sequence of several different analog quantities.

The digital converter constituting this invention is advantageous because it provides a discharge of the capacitance 170 at a substantially constant rate even with variations in the potential produced across the resistance 18. This results from the inclusion in the converter of elements including the transistor 132, the diodes 140 and 142 and the resistance 144 to produce at the terminal common to the resistances 188 and 190 a potential which floats in accordance with the potential produced across the resistance 18. A substantially constant discharge of the capacitance 170 is important since the clock signals are passed to the counter 396 in FIGURE 3 during the time that the capacitance is being discharged. A constant discharge of the capacitance 170 insures that the capacitance becomes discharged only for a proper time dependent upon the charge in the capacitance at the beginning of the discharge period.

The converter constituting this invention is also advantageous since it provides a measurement of analog input quantities having a negative polarity. This results from the inclusion of elements such as the resistance 174 and rheostat 176. The operation of the converter in providing indications for analog input quantities having negative polarities may be seen by considering the operation of the converter when the analog input is zero. At such a time, the capacitance 170 becomes charged through a circuit including the voltage source 28, the resistance 114, the transistors 112 and 120, the capacitance 170, the resistance 174, the rheostat 176 and the resistances 178 and 180. The capacitance 170 is able to charge through this circuit without producing any voltage across the resistance 18 since the resistances and rheostat in the circuit operate to produce a potential approaching ground at the terminal common to the resistance 174 and the capacitance 170. A potential approaching the converter ground has to be produced at such a time in order for the potential across the resistance 18 to match the input potential from the source 10.

Since a charge of the capacitance 170 occurs even for an analog input having a value of zero, an output indication is obtained. This output indication is dependent upon the time required for the capacitance 170 to discharge until a potential of substantially −10 volts is produced on the line 126. For example, an output indication such as a value of "2,000" can be provided by the counter 396 when the analog input quantity has a value of zero. As the analog input quantity drops below zero in a negative direction, the reading in the counter 396 correspondingly decreases below the value such as 2,000 toward a value of zero. Proper readings are obtained in the range between zero and 2,000 even though a negative voltage is produced across the resistance 18 corresponding to the negative potential introduced from the source 10. Proper readings are obtained since the capacitance 170 is charging even for these negative input quantities.

When the reading of the counter 396 reaches zero, the capacitance 170 is no longer able to charge since the transistor 120 becomes non-conductive. For negative input quantities having an amplitude greater than that produced by a zero reading in the counter 396, the resistance 18 acts as a generator to produce a flow of current through the resistance 174 and the rheostat 176. The operation of the resistance 18 as a generator causes the capacitance 170 to be by-passed so that readings below zero are not produced in the counter 396.

The converter constituting this invention is advantageous in another important respect. This results from the positive gating provided by the circuit such as the transistor 282, the pulse transformers 286 and 290 and the diode 288. Because of this positive gating, the periods of time for charging and discharging the capacitance 170 are precisely controlled by the clock pulses from the source 294 and by the timing pulses from the computer 295. Such a precise control over the charging and discharging periods of the capacitance 170 tends to increase the accuracy of the digital representations.

The gating operation provided by the pulse transformers such as the transformers 290—318 is also advantageous in that it tends to isolate the ground potentials provided by the computer 295 and the converter constituting this invention. This is important since the ground potentials provided by the computer and the converter may tend to vary considerably relative to each other at different times and accordingly may tend to affect the operation of the converter. Isolating the grounds provided by the computer 295 and the converter constituting this invention not only insures the proper operation of the converter but also insures that the proper ground will be at the output of the gate.

The converter constituting this invention is adapted to operate with analog input quantities represented by alternating voltages as well as analog input quantities represented by direct voltages. The alternating voltages are converted by the source 10 into corresponding direct voltages. However, in A.C./D.C. converters, the production of a potential for discharging the capacitance 170 and the production of a ground potential cannot be controlled in a manner similar to that described previously for direct potentials. These variations in the operating potential of A.C./D.C. converters and in the converter ground tend to produce variations in the direct voltage produced by the converter even though the analog quantity may remain substantially constant.

The operation of the digital converter constituting this invention on the signals produced by an A.C./D.C. converter is initiated by the introduction of a signal to the amplifiers 203. This signal causes the relay 202 to be energized so that the movable contacts of the switches 200 and 205 become actuated into engagement with the lower stationary contacts of the switches in FIGURE 1. When the switch 205 becomes actuated in this manner, the ground potential of the A.C./D.C. converter is introduced to the ground potential of the digital converter constituting this invention to control the ground potential of the digital converter. At the same time, the switch 200 causes the voltage source 201 in the A.C./D.C. converter to control the discharge of the capacitance 170. In this way, the potential at any instant for discharging the capacitance 170 varies in a manner similar to the variations in the potential from the source 10. This compensates for any variations in the potential introduced from the source 10 to the converter constituting this invention when such variations in potential represent undesired fluctuations rather than changes in the value of the analog input quantity.

Circuitry is shown in FIGURE 6 for use when the converter shown in FIGURES 1 to 5, inclusive, and described above is to be utilized on a multiplexing basis to provide indications as to the value of a plurality of different parameters. For example, switches may be sequentially operated for the converter to provide digital indications initially as to the value of a temperature measurement, subsequently to provide indications as to the value of a pressure measurement and then to provide indications as to the value of a humidity measurement. In this way, one converter can be used on a time-sharing basis to provide indications in digital form as to the values of a plurality of analog quantities.

The circuitry shown in FIGURE 6 includes a pair of resistances 401 and 403 having first terminals connected to the terminal 25 in the voltage source 28 to receive a positive potential of +10 volts. The second terminal of the resistance 401 is connected to a multiplexer 405 which operates to produce a signal periodically with a gradually rising characteristic and a sharply falling characteristic. Such multiplexers are well known in the art.

A capacitance 407 is connected between the second terminals of the resistances 401 and 403. The resistances 401 and 403 may respectively have values in the order of 3.3 kilo-ohms and 10 kilo-ohms, and the capacitance 407 may have a value in the order of 820 micro-microfarads.

A connection is made to the base of a PNP transistor 409 from the terminal common to the resistance 403 and the capacitance 407. The transistor 409 may be a Type 2N217. The emitter of the transistor 409 may have a suitable potential of +5 volts applied to it from a terminal 411 in the voltage source 28. A resistance 413 having a value in the order of 10 kilo-ohms is connected between the collector of the transistor 409 and the terminal 27 in the voltage source 28 for providing a negative potential of −10 volts. The plate of a diode 415 is also connected to the collector of the transistor 409, and a resistance 417 and a rheostat 419 are in series between the cathode of the diode 415 and the terminal 27 in the voltage source 28. The diode 415 may be a Type 1N167, and the resistance 417 and the rheostat 419 may respectively have values in the order of 56 kilo-ohms and 10 kilo-ohms.

The signals passing through the diode 415 are applied to the base of a PNP transistor 421, which may also be a Type 2N217. The emitter of the transistor 421 has a positive bias applied to it from the terminal 411 in the voltage source 28 through a resistance 422, which may have a value in the order of 470 ohms. The collector of the transistor 421 has a negative bias applied to it from the terminal 27 of the voltage source 28 through a resistance 424 which may have a value in the order of 3.9 kilo-ohms.

The potential on the collector of the transistor 421 is applied to the base of a PNP transistor 426 through a resistance 428 having a value in the order of 15 kilo-ohms. The base of the transistor 426 is also connected to one terminal of a resistance 430, the second terminal of which receives the positive potential of +5 volts from the terminal 411 of the voltage source 28. The transistor 426 may be a Type 2N217, and the resistance 428 may have a value in the order of 15 kilo-ohms.

The emitter of the transistor 426 has a common connection with the emitter of the transistor 421. The collector of the transistor 426 has a negative bias applied to it from the terminal 27 of the voltage source 28 through a resistance 434 which may have a value in the order of 2 kilo-ohms. The collector of the transistor 426 is also connected to the plate of a diode 436, the cathode of which has common connections with first terminals of a resistance 438 and a capacitance 440.

The second terminal of the resistance 438 is connected to the terminal 27 in the voltage source 28 to receive a potential of −10 volts, and the second terminal of the capacitance 440 is connected to the base of the transistor 421. The resistance 438 and the capacitance 440 may respectively have values in the order of 6.8 kilo-ohms and 0.22 microfarad and the diode 436 may be a Type 1N167.

The signals produced on the collector of the transistor 426 are introduced through a coupling capacitance 442 to the base of a PNP transistor 444, which may also be a Type 2N217. The base of the transistor 444 is positively biased from the terminal 25 of the voltage source 28 through a resistance 446, which may have a value in the order of 10 kilo-ohms. The emitter of the transistor 444 is directly connected to the terminal 411 of the voltage source 20 to receive a positive potential of +5 volts. The collector of the transistor 444 is negatively biased from the terminal 27 of the voltage source 28 through a resistance 448 which may have a value in the order of 10 kilo-ohms.

A coupling capacitance 450 having a value in the order of 0.5 microfarad is connected between the collector of the transistor 444 and one terminal in the primary winding of a pulse transformer 452. The second terminal of the primary winding in the transformer 452 is connected to the terminal 25 in the voltage source 28 to receive a positive potential of +10 volts. The secondary winding of the transformer 452 is in series with the resistances 12 and 18 also shown in FIGURE 1. Ganged switches 454 and a source of analog potential 456 are also included in the series circuit.

The switches 454 may be included in the multiplexer 405 so as to close when a particular reading such as the measurement of temperature is to be made. The resistance 456 is adapted to provide a voltage which is indicative of the particular measurement such as temperature. In this way, the resistance 456 serves as the equivalent of the source 10 of analog input in FIGURE 1. For a different measurement than temperature, other switches in the multiplexer 405 than the switches 454 and other sources of analog input than the resistance 456 may be included in the series circuit with the secondary winding of the transformer 452 and the resistances 12 and 18.

The signals passing through the coupling capacitance 450 are introduced to the base of a PNP transistor 460, which may also be a Type 2N217. A capacitance 462 and a resistance 464 are in parallel between the emitter of the transistor 460 and the terminal 411 in the voltage source 28. The capacitance 462 and the resistance 464 may be respectively provided with values in the order of 0.01 microfarad and 10 kilo-ohms. A resistance 466 having a value in the order of 10 kilo-ohms extends electrically between the collector of the transistor 460 and the terminal 27 in the voltage source 28.

One terminal of a coupling capacitance 468 is connected to the collector of the transistor 460, and the second terminal of the capacitance is connected to one terminal of a resistance 469, the second terminal of which receives a potential of approximately −30 volts from the terminal 133 in the voltage source 28. Connections are also made from the second terminal of the capacitance 468 to the cathode of a diode 470 and to the plate of a diode 472, both of which may be Types 1N167. The plate of the diode 470 is connected to the converter ground, and the cathode of the diode 472 is connected to the base of a PNP transistor 474, which may be a Type 2N217.

A resistance 476 having a value in the order of 2.4 kilo-ohms extends electrically between the terminal 411 of the voltage source 20 and the base of the transistor 474. The emitter of the transistor 474 has a positive potential applied to it from the terminal 25 of the voltage source 28 through a resistance 478, which may have a value in the order of 1 kilo-ohm. The collector of the transistor 474 is negatively biased through a resistance 480 from the terminal 133 in the voltage source 28. The plate of a diode 484 is also connected to the collector of the transistor 474, and the cathode of the diode is grounded. In like manner, the cathode of a diode 486 is connected to the collector of the transistor 474 and the plate of the diode is connected to the terminal 27 in the voltage source 28. The diodes 484 and 486 may be Types 1N167.

A resistance 490 having a suitable value such as approximately 15 kilo-ohms couples the collector of the transistor 474 to the base of a PNP transistor 492, which may also be a Type 2N217. A resistance 494 extends electrically between the base of the transistor 492 and the terminal 411 in the voltage source 28. The emitter of the transistor 492 has a common connection with the emitter of the transistor 474. The collector of the transistor 492 is connected to one terminal of a resistance 496 having a suitable value such as approximately 6.8 kilo-ohms, the second terminal of the resistance being connected to the terminal 133 in the voltage source 28. The potential on the collector of the transistor 492 is also coupled to the base of the transistor 474 through a resistance 498, which may have a value in the order of 15 kilo-ohms.

Signals are applied to the base of the transistor 492 through a coupling capacitance 500 and a diode 502 from the collector of the transistor 409. The diode 502 is connected so that only positive signals can be applied to the base of the transistor 492, and the capacitance 500 may be provided with a value in the order of 820 microfarads. The cathode of a diode 504 is connected to the plate of the diode 502, and the plate of the diode 504 is connected to converter ground. The diodes 502 and 504 may also be a Type 1N167.

The signals produced on the collector of the transistor 474 are applied to the base of a transistor 506, which may also be a Type 2N217. The collector of the transistor 506 is connected to the line 27 of the voltage source 28 to receive a negative potential. A resistance 508 extends electrically between the emitter of the transistor 506 and the terminal 25 in the voltage source 28. An output line 510 is also connected to the emitter of the transistor 506.

As will be seen from FIGURE 7, charging and discharging of the capacitance 170 in FIGURE 1 occurs on a sequential basis through a plurality of cycles. During a particular number of such cycles such as 10 cycles, no output indications are provided when a number of different measurements are multiplexed to provide digital output indications as to the different measurements in succession. For example, the multiplexer may be electrically disposed so that measurements as to temperature are converted by the apparatus constituting this invention into digital indications representing such measurements. During a first number of cycles, no output indications as to temperature are provided so that any transient effects resulting from the operation of the multiplexer can be minimized. This period is indicated at 520 in FIGURE 7. After the period 520, output indications are provided in the counter 396 in FIGURE 3 for a plurality of cycles such as 10 cycles. This output period is indicated at 522 in FIGURE 7. As described above, averaging techniques are improved by counting the number of output pulses over a plurality of measurements so that accuracy in the output indications becomes enhanced.

Every time that the multiplexer 405 operates, new switches are inserted into the series circuit which includes the secondary winding of the transformer 452 and the resistances 12 and 18. For example, the switches 454 become inserted into the circuit when digital output indications are to be provided as to a parameter such as temperature. When any particular set of switches such as the switches 454 close, transient conditions are produced for a certain period of time until the movable arms of the switches become settled in position against the stationary arms of the switches. This transient period occurs at the beginning of the period 520 in FIGURE 7 as indicated at 524 in FIGURE 7. At the end of this transient period 520 it is often desirable to provide a determination as to whether the switches have actually closed so that proper measurements can be obtained. The circuitry shown in FIGURE 6 provides such an indication.

Each relay coil in the multiplexer 405 is constructed to produce a signal having characteristics similar to that indicated in FIGURE 7 and to produce this signal during a period of time corresponding to the total elapsed time of the periods 520 and 522. The signal produced by the relay has a gradually rising characteristic 526 which starts at the beginning of the settling period 520 and continues until the end of the period 522 at which a particular measurement controlled by the relay is being made. The operation of the relay then becomes interrupted so that a sharp trailing characteristic 528 in the signal produced by the relay is produced.

The signal produced by each relay coil in the multiplexer 405 is differentiated by the circuitry which includes the resistance 403 and the capacitance 407. Because of the shallow slope of the signal portion 526, a positive signal having a relatively low amplitude is produced during this time. This signal has no effect on the transistor 409 since the transistor is biased through the resistance 403 to a state of non-conductivity. However, a sharp triggering signal of negative polarity is produced upon the differentiation of the signal portion 528. This triggering signal is indicated at 530 in FIGURE 6 and is instrumental in making the transistor 409 conductive.

When the transistor 409 becomes conductive, the potential on the collector of the transistor rises from a negative value to a positive value approaching that provided by the terminal 411 of the voltage source 28. This causes a positive signal to be produced on the collector of the transistor 409, as indicated at 532 in FIGURE 6. The positive signal passes through the diode 415 and causes the transistor 421 to become cut off. When the transistor 421 becomes cut off, the potential on the collector of the transistor falls to a value approaching the value of −10 volts on the terminal 27 of the voltage source 28. This potential is introduced to the base of the transistor 426 to make the transistor conductive. Current then flows through a circuit including the voltage source 28, the resistance 422, the transistor 426 and the resistance 434. This current produces a rise in the potential on the collector of the transistor 426, the rise in potential being applied to the base of the transistor 421 to maintain the transistor non-conductive.

During the time that the transistor 426 is conductive, current also flows through a circuit including the resistance 422, the transistor 426, the diode 436, the capacitance 440, the resistance 417 and the rheostat 419 to charge the capacitance 440. As the capacitance 440 becomes charged, a potential drop is produced across the capacitance. This causes the potential applied to the base of the transistor 421 to decrease until finally the transistor is rendered conductive. The period of time for maintaining the transistor 421 non-conductive can be controlled by adjusting the value of the rheostat 419. For example, when the combined time for the periods 520 and 522 in FIGURE 7 is approximately 400 microseconds, the transistor 421 may be rendered non-conductive for a period of approximately 10 microseconds. This period occurs immediately after the period 522, as indicated at 524 in FIGURE 7.

When the transistor 421 becomes conductive, current flows through a circuit including the resistance 422, the transistor and the resistance 424 so that the potential on the collector of the transistor rises. This rise in potential renders the transistor 426 non-conductive such that the potential on the collector of the transistor falls to a potential approaching −10 volts. In this way, the transistors 420 and 426 function as a one-shot multivibrator in which a positive pulse is produced on the collector of the transistor 426 for a suitable period such as approximately 10 microseconds. This is indicated at 536 in FIGURE 7.

The positive pulse 536 on the collector of the transistor 426 is differentiated by the capacitance 442 and the resistance 446 so that a positive pulse illustrated at 538 in FIGURE 7 is produced at the leading edge of the pulse 536 and a negative pulse illustrated at 540 in FIGURES 6 and 7 is produced at the trailing edge of the pulse 536. The positive pulse 538 produced by the differentiator has no effect on the transistor 444 since the transistor 444 is biased to a state of non-conductivity by the resistance 446. However, the negative pulse 540 renders the transistor 444 conductive. The resultant flow of current through the transistor 444 and the resistance 448 causes the potential on the collector of the transistor 444 to rise, as indicated at 542 in FIGURE 6. This rise in potential is applied through the capacitance 450 to the primary winding of the transformer 452 so that a pulse is induced in the secondary winding of the transformer.

When a continuous circuit is established from the resistance 456 through the secondary winding of the transformer 452 to the resistances 12 and 18, the pulse 542 produced in the primary winding of the transformer becomes quickly damped, as indicated at 544 in FIGURE 8. Under such circumstances, the potential produced on the collector of the transistor 444 never falls below the potential of +5 volts at which the emitter of the transistor is biased.

Upon the occurrence of an open circuit in the series circuit including the resistances 12 and 18, damping cannot occur so that a considerable overshoot in a negative direction occurs. This overshoot is indicated at 546 in FIGURE 8. The negative overshoot results from the fact that no load is applied to the secondary winding of the transformer 452 to absorb the energy resulting from the pulse 542 introduced to the primary winding of the transformer. Because of this, the potential at the collector of the transistor 444 overshoots in a negative direction so as to become more negative than the potential of +5 volts.

The negative overshoot 546 is introduced as a negative triggering pulse to the base of the transistor 460, which is based to a state of non-conductivity at a potential of +5 volts through the resistance 464 from the source 28. The negative signal 546 causes the transistor 460 to become conductive so that current flows through a circuit including the capacitance 462 and the resistance 464 in parallel, the transistor 460 and the resistance 466. The resultant rise in the potential on the collector of the transistor 466 is introduced as a positive signal 548 in FIGURE 6 to the base of the transistor 474 to render the transistor non-conductive.

When the transistor 474 becomes cut off, the potential on the collector of the transistor 474 falls to a potential approximating −30 volts, as indicated at 550 in FIGURE 6. The negative signal 550 in turn causes the transistor 506 to become conductive so that current flows through a circuit including the voltage source 28, the resistance 508 and the transistor. Because of this flow of current, the potential on the emitter of the transistor 506 decreases from a value approximating converter ground to a value approximating the potential of −10 volts on the collector of the transistor. This decrease in potential on the output line 510 provides an indication that the series circuit to the resistances 12 and 18 has not been completed.

The positive pulse 532 produced at the end of the period 522 is not only introduced to the base of the transistor 421 but is also introduced to the base of the transistor 492. This pulse renders the transistor 492 non-conductive such that the potential on the collector of the transistor approaches the value of −30 volts on the terminal 133 of the voltage source 28. This negative potential is introduced to the base of the transistor 474 to render the transistor conductive. In this way, the transistors 474 and 492 operate as a flip-flop.

When the transistor 474 becomes conductive, the resultant flow of current through the transistor and the resistance 480 causes the potential on the collector of the transistor to rise to a ground potential. The potential of the collector of the transistor 474 is clamped substantially at ground potential because of the action of the diode 484. However, this ground potential is sufficient to cut off the transistor 506 so that a ground potential is produced on the emitter of the transistor.

Upon the occurrence of a continuous series circuit through the switches such as the switches 454 and the resistances 12 and 18 at the end of the period 536, the signal 544 produced on the collector of the transistor 444 does not fall below a potential of +5 volts. This prevents the transistor 460 from becoming conductive and from producing a signal to cut off the transistor 474. Since the transistor 474 remains conductive, a ground potential continues to be produced on the collector of the transistor to maintain the transistor 506 non-conductive. In this way, a ground potential is produced on the output line 510. This ground potential cannot provide an alarm to indicate a failure to obtain proper output indications from the converter constituting this invention.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for converting an input potential having an amplitude representing an analog quantity into a plurality of signals digitally representing the quantity, a reactance member for storing energy, an impedance member, means including a charging circuit and including the reactance member and the impedance member in the charging circuit for producing a storage of energy in the reactance member for a particular period of time and at a rate dependent upon the input potential and for producing across the impedance member a potential opposing the input potential, a source of regulated potential, means including electrical circuitry coupled to the source of regulated potential and to the charging circuit for varying the regulated potential in accordance with the potential produced across the impedance member, means including a discharge circuit coupled to the last mentioned means and to the reactance member for producing a discharge of the reactance member to a particular level at a substantially constant rate, and digitizing means coupled to the last mentioned means for activation to produce successive signals during the discharge of the reactance member.

2. In combination for converting an input potential having an amplitude representing an analog quantity into a plurality of signals digitally representing the quantity, a capacitance, means including a charging circuit coupled to the capacitance for charging the capacitance for a particular period of time to a value proportional to the amplitude of the input potential, means including a discharge circuit coupled to the capacitance and responsive to the current flowing through the charge circuit for providing a discharge of the capacitance at a constant rate after the charge of the capacitance and until the occurrence of a particular net charge in the capacitance, signal means coupled to the discharge circuit for producing a control signal during the discharge of the capacitance, clock means for providing a plurality of pulses at periodically spaced intervals of time, gating means responsive to the control signal from the signal means and synchronized in operation with the clock pulses for passing the clock pulses during the production of the control signal, control means responsive to the clock pulses to become operative in first and second states after particular periods of time corresponding to a plurality of successive pulses, and counting circuitry coupled to the gating means and the control means for counting the number of pulses passed by the gating means during the operation of the control means in the first state.

3. In combination for converting an input potential having an amplitude representing an analog quantity into a plurality of signals digitally representing the quantity, integrating means, first electrical circuitry coupled to the integrating means for producing a transfer of energy into the integrating means for a particular period of time and at a rate dependent upon the input potential, impedance means coupled to the integrating means for providing a potential opposing the input potential and having an amplitude dependent upon the rate of transfer of energy into the integrating means, means including amplifier means responsive to any differences in potential between the input potential and the potential across the impedance means to obtain variations in the rate of transfer of energy into the integrating means in a direction for making the potential across the impedance means equal to the input potential, second electrical circuitry coupled to the integrating means and responsive to the rate of energy transfer into the integrating means at any instant for producing a substantially constant potential relative to the potential across the impedance means at that instant to obtain an energy transfer out of the integrating means at substantially constant rate, third electrical circuitry coupled to the integrating means for interrupting the transfer of energy out of the integrating means upon the occurrence of a particular energy level in the integrating means, and means operative during the transfer of energy out of the integrating means for providing for the periodic passage of pulses.

4. In combination for converting an input potential having an amplitude representing an analog quantity into a plurality of signals digitally representing the quantity, a capacitance, a resistance connected to the capacitance, means including an amplifier connected to receive the input potential and including a circuit defined in part by the resistance and capacitance for producing through the capacitance for a particular period of time a flow of charging current related to the input potential to produce across the resistance a potential equal to and opposing the input potential and to charge the capacitance to a value dependent upon the amplitude of the current flow, means including a source of regulated potential connected in a circuit with the capacitance for discharging the capacitance after the charging period and at a substantially constant rate, means coupled electrically to the potential source for varying the regulated potential from the source in accordance with the potential across the resistance to maintain the discharging current through the capacitance at a substantially constant rate, gating means coupled electrically to the capacitance for providing a gating pulse during the discharge of the capacitance and until the discharge of the capacitance to a particular level, and a source of periodic signals coupled electrically to the gating means for providing for the passage of the signals during the production of the gating pulse to provide a digital indication as to the analog input quantity.

5. In combination for converting an input potential having an amplitude representing an analog quantity into a plurality of signals digitally representing the quantity, a source of periodic pulses, first gating means, integrating means responsive to the input potential upon an activation of the first gating means for producing an energy integral proportional to the input potential in relationship to a particular standard, means including a source of potential coupled electrically to the integrating means for variation with the input potential to provide a substantially constant reference current even with variations in the input potential and with variations in the energy integral in the integrating means, second gating means connecting the source of reference current to the integrating means upon an activation of the gating means and in an opposite direction to the electrical coupling of the input potential to the integrating means for returning the energy integral toward the particular standard, means operative upon the first and second gating means for initially providing an activation of the first gating means for a particular period of time and for subsequently providing an activation of the second gating means for a period of time dependent upon the operation of the reference current in returning the energy integral in the integrating means to the particular standard, and means coupled to the pulse source and to the second gating means for providing a passage of the pulses during the activation of the second gating means to provide a digital indication as to the amplitude of the input potential.

6. In combination for converting an input potential having an amplitude representing an analog quantity into a plurality of signals digitally representing the quantity, a source of periodic pulses, first gating means, integrating means responsive to the input potential upon an activation of the first gating means for producing in the integrating means an energy integral proportional to the input potential in relationship to a particular negative standard, an impedance member connected to the integrating means for producing a potential opposing the input potential, means including a source of potential coupled electrically to the integrating means and the impedance member for variation with the potential across the impedance member to provide a substantially constant reference current even with variations in the input potential and with variations in the energy integral in the integrating means, said last named means also including means for providing the reference current even with negative energy integrals, second gating means connecting the source of reference current to the integrating means upon an activation of the gating means and in an opposite direction to the connections of the input potential to the integrating means for returning the energy integral toward the particular standard, means including electrical circuitry operative upon the first and second gating means for initially providing an activation of the first gating means for a particular period of time and for subsequently providing an activation of the second gating means for a period of time dependent upon the operation of the reference current in returning the energy integral in the integrating means to the particular standard, and means including electrical circuitry coupled to the pulse source and to the second gating means for providing a passage of the pulses during the activation of the second gating means to provide a digital indication as to the amplitude of the input potential.

7. In combination for converting an input potential having an amplitude representing an analog quantity into a plurality of signals digitally representing the quantity, integrating means, first means responsive to the input potential for varying the energy in the integrating means for a particular period of time and for producing such variation to a level dependent upon the potential in the input means, second means operative after the variation of the energy level in the integrating means by the first means for producing an energy variation in the integrating means at a substantially constant rate and in an opposite direction to the energy variation produced by the last mentioned means, control means responsive to the energy level in the integrating means for producing signals having a first amplitude for energy levels above a particular value in the integrating means and for producing signals having a second amplitude for energy levels below a particular value in the integrating means, a transformer having first and second windings, means for introducing clock signals to the first winding of the transformer, an output indicator coupled electrically to the second winding of the transformer and responsive to the number of clock signals passing through the second winding, means including the control means connected to the transformer for providing for a passage of the clock signals through the second winding of the transformer to the indicator only upon the occurrence of the first amplitude in the control means, and means operative upon the first and second energy-varying means for controlling the operation of these means in accordance with the passage of the clock signals through the second winding of the transformer.

8. Apparatus as set forth in claim 7 in which an impedance member is connected to the integrating means for producing a potential opposing the input potential and in which means including a source of potential is coupled electrically to the integrating means and the impedance member for variation with the potential across the impedance member to provide a substantially constant energy variation in the integrating means by the second means even with variations in the input potential and with variations in the energy integral in the integrating means and in which the first gating means and the second gating means include pulse transformers.

9. In combination for converting an input potential having an amplitude representing an analog quantity into a plurality of signals digitally representing the quantity, a capacitance, means including a charging circuit for providing a charging of the capacitance at a rate dependent upon the input potential and for a particular period of time and including a first resistance in the charging circuit for providing a potential proportional to the rate of charging of the capacitance, means including an amplifier coupled to the charging circuit and responsive to any differences between the input potential and the potential across the first resistance for varying the rate of charging of the capacitance to render the potential across the first resistance equal to the input potential, means including a discharge circuit coupled to the capacitance for producing a discharge of the capacitance after the charge of the capacitance, means including a source of reference potential coupled to the amplifier for maintaining a substantially constant potential difference between the reference potential and the potential across the first resistance to produce a substantially constant discharge current from the discharge circuit through the capacitance, means including control means coupled to the capacitance for providing a first signal upon the discharge of the capacitance to a particular level and for maintaining the first signal until the initiation of the next discharge of the capacitance and for providing a second signal during the discharge of the capacitance, a transformer having first and second windings, means coupled to the first winding of the transformer for periodically introducing a triggering signal to the winding upon the passage of a particular period of time after the production of the first signal to obtain the production of the second signal in the control means, the control means being coupled to the transformer to obtain the passage of the triggering signal upon the simultaneous occurrence of the triggering signal and the first signal in the control means, and a source of clock pulses coupled to the control means for providing for the passage of the clock pulses upon the occurrence of the second signal in the control means.

10. In combination for converting an input potential having an amplitude representing the analog quantity into a plurality of signals digitally representing the quantity, a capacitance, means including a charging circuit connected to the capacitance for producing a charging of the capacitance for a particular period of time and at a rate dependent upon the input potential, a first resistance connected in the charging circuit for receiving a potential proportional to the rate of charging of the capacitance, means including an amplifier responsive to the input potential and the potential across the first resistance for varying the charging current to maintain the potential across the first resistance equal to the input potential, means including a source of reference potential coupled to the charging circuit and including a second resistance having an amplitude responsive to the charging current for producing a substantially constant reference potential relative to the potential across the first resistance and in accordance with the potential produced across the second resistance, means including a discharge circuit coupled to the source of reference potential and to the capacitance for providing a substantially constant discharge of the capacitance after the particular period for charging the capacitance, means including first gating means coupled to the capacitance for providing on a cyclic basis for a charging of the capacitance for particular periods of time and for providing for the subsequent discharges of the capacitance until the occurrence of a particular energy level in the capacitance, a source of clock pulses, means including second gating means coupled to the first gating means and to the source of clock pulses for passing the clock pulses only during particular periods for discharge of the capacitance and for controlling the particular periods in accordance with the charge produced in the capacitance, and means including a counter for counting the pulses passed by the second gating means.

11. In combination for converting an input potential having an amplitude representing an analog quantity into a plurality of signals digitally representing the quantity, integrating means, first electrical circuitry including the integrating means for producing a transfer of energy into the integrating means for a particular period of time and at a rate dependent upon the input potential, a first resistance included in the first electrical circuitry to produce a potential opposing the input potential and having an amplitude proportional to the rate of energy transfer into the integrating means, means including an amplifier responsive to any differences between the input potential and the potential across the first resistance for varying the rate of energy transfer into the integrating means in a direction to reduce any such potential differences, means including second electrical circuitry and including the integrating means in the second electrical circuitry and coupled to the first resistance and including a second resistance for producing a potential having a substantially constant value relative to the potential across the first resistance to produce a substantially constant rate of energy transfer out of the integrating means and including at least a third resistance for biasing the circuitry to maintain such energy transfer from the circuitry out of the integrating means even for input potentials having negative input potential, means including third electrical circuitry coupled to the integrating means for interrupting the transfer of energy out of the integrating means upon the occurrence of a particular standard of energy level in the integrating means and including stages for producing a first signal during the transfer of energy out of the integrating means and for producing a second signal at other times, a source of periodic clock pulses, and means including fourth electrical circuitry coupled to the clock source and to the third electrical circuitry for retaining the clock source and the third electrical circuitry in isolated relationship to each other and for passing the clock pulses during the production of the first signal by the third electrical circuitry.

12. In combination for converting an input potential having an amplitude representing an analog quantity into a plurality of signals digitally representing the quantity, integrating means, first means responsive to the input potential for providing an integral of energy in the integrating means for a particular period of time and for producing such energy integral to a level dependent upon the potential in the input means, second means operative after the production of the energy integral in the integrating means for dissipating the energy integral in the integrating means at a substantially constant rate and until the occurrence of a particular energy integral in the integrating means, control means responsive to the energy integral in the integrating means for producing a first signal upon the occurrence of energy integral above a particular value in the integrating means and for producing a second signal upon the occurrence of an energy integral at the particular value in the integrating means, a first transformer having first and second windings, a source coupled to the first winding of the first transformer for introducing periodic pulses to the transformer, means including electrical circuitry coupled to the transformer for providing for the passage of the clock pulses through the transformer only upon the occurrence of the first signal in the control means, a second transformer having first and second windings, means coupled to the first winding of the second transformer for introducing periodic triggering pulses to the winding, means including electrical circuitry coupled to the second transformer for providing for the passage of the triggering pulse through the transformer only upon the production of the second signal in the control means, means responsive to the passage of the triggering pulse through the second transformer for activating the energy-dissipating means, and means operative during the activation of the energy-dissipating means for providing for the passage of pulses at periodic intervals to represent the analog quantity in digital form.

13. In combination for converting an input potential having an amplitude representing an analog quantity into a plurality of signals digitally representing the quantity, integrating means, first means responsive to the first potential for providing an integral of energy in the integrating means for a particular period of time and for producing such energy integral to a level dependent upon the potential in the input means, second means operative after the production of the energy integral in the integrating means for dissipating the energy integral in the integrating means at a substantially constant rate and until the occurence of a particular level in the integrating means, means coupled to the second means for providing for the passage of signals at periodic intervals during the dissipation of the energy integral in the integrating means to provide for a digital indication of the potential from the input means, and means coupled to the last mentioned means for providing for the passage of the periodic signals through a plurality of cycles of energy increase and dissipation in the integrating means to provide an averging of the output digital indication.

14. In combination for operating upon a plurality of input potentials each having an amplitude representing an analog quantity and for converting each input potential into a plurality of signals digitally representing the quantity, a reactance member for storing energy, means including a charging circuit and including the reactance member in the charging circuit for producing a storage of energy in the reactance member for a particular period of time and at a rate dependent upon the input potential being converted at any instant, means including a discharge circuit coupled to the reactance member and operative upon the storage of energy in the reactance member for producing a dissipation of energy in the reactance member to a particular level and at a substantially constant rate, means coupled to the charge circuit and the discharge circuit for sequentially testing for each input potential in the plurality, means coupled to the charge circuit and discharge circuit for providing for a test of each input potential in the plurality through a particular number of charge and discharge cycles, and means coupled to the last mentioned means and to the discharge circuit for providing for the passage of signals at periodic intervals during the discharge periods in the particular number of cycles for each input potential to provide a digital indication as to the value of the input potential.

15. In the combination set forth in claim 14, means coupled to the sequential testing means for providing a first output signal upon the establishment of a continuous circuit to the converter from the input potential being tested and for providing a second output signal upon a failure to establish a continuous circuit to the converter from the input potential being tested.

16. Apparatus as set forth in claim 14 in which means including a source of potential is coupled electrically to the reactance member for variation with the input potential to provide a substantially constant dissipation of energy in the discharge circuit even with variations in the input potential.

17. In combination for operating upon a plurality of input potentials each having an amplitude representing an analog quantity and for converting each input potential into a plurality of signals digitally representing the quantity, a capacitance, means including a charging circuit coupled to the capacitance for charging the capacitance for a particular period of time to a value proportional to the amplitude of the input potential, means including a discharge circuit coupled to the capacitance and operative upon the charging of the capacitance for the particular period of time to provide a discharge of the capacitance at a constant rate after the charge of the capacitance and until the occurrence of a particular level of charge in the capacitance, first control means coupled to the discharge circuit for producing a first control signal during each period of discharge of the capacitance, second control means operative to produce a second control signal having first characteristics upon a first occurrence of a particular number of the first control signals and having second characteristics upon the subsequent occurrence of the particular number of the first control signals, first testing means coupled to the second control means for sequentially testing for each input potential in the plurality and for a period of time corresponding to the production of the first and second characteristics in the second control signal, and means coupled to the first and second control means and to the testing means for obtaining the passage of signals at periodic intervals during the simultaneous occurrence of the first control signal and the second characteristics in the second control signal.

18. The combination as set forth in claim 17 in which second testing means are coupled to the first testing means and to the second control means to test after a particular time during the occurrence of the first characteristics in the second control signal and to obtain the production of a first signal at the time of the test upon the establishment of a continuous circuit to the converter from the input potential being converted and to obtain the production of a second signal at the time of the test upon a failure to establish a continuous circuit to the converter from the input potential being converted.

19. In combination for converting an input potential having an amplitude representing an analog quantity into a plurality of signals digitally representing the quantity, a capacitance, a first resistance connected to the capacitance at a common point, a second resistance connected to said common point, amplifier means connected to receive the input potential and including a first resistance and capacitance connected in circuit for producing a charging current flow through said capacitance for a particular period of time in response to a positive-going input potential whereby to produce across the resistance a potential equal to and opposing the input potential and charge the capacitance to a value dependent upon the amplitude of the current flow, said first named means also including a second circuit defined in part by said second resistance and capacitance for producing a charging current flow through said capacitance for said particular period of time in response to a negative-going input potential whereby to produce across said second resistance a potential equal to and opposing said negative-going input potential and charge the capacitance to a value dependent upon the amplitude of the current flow, means including a source of regulated potential connected in a circuit with the capacitance for discharging the capacitance after the charging period and at a substantially constant rate, means coupled electrically to the potential source for varying the regulated potential from the source in accordance with the potential across the first and second resistances to maintain the discharging current through the capacitance at a substantially constant rate, gating means coupled electrically to the capacitance for providing a gating pulse during the discharge of the capacitance and until the discharge of the capacitance to a particular level, and a source of periodic signals coupled electrically to the gating means for providing for the passage of the signals during the production of the gating pulse to provide a digital indication as to the analog input quantity.

References Cited in the file of this patent

UNITED STATES PATENTS

| | | |
|---|---|---|
| 2,560,124 | Mofenson | July 10, 1951 |
| 2,616,965 | Hoeppner | Nov. 4, 1952 |
| 2,787,418 | MacKnight | Apr. 2, 1957 |
| 2,836,356 | Forrest | May 27, 1958 |
| 2,839,740 | Haanstra | June 17, 1958 |
| 2,840,806 | Bateman | June 24, 1958 |
| 2,885,662 | Hansen | May 5, 1959 |
| 2,885,663 | Curtis | May 5, 1959 |
| 2,941,196 | Raynsford | June 14, 1960 |